(12) United States Patent
Ito

(10) Patent No.: US 7,220,960 B2
(45) Date of Patent: May 22, 2007

(54) OPTICAL ENCODER HAVING A LIGHT SOURCE SCALE AND PHOTODETECTOR AND AN OPTICAL LENS MODULE USING THE OPTICAL ENCODER

(75) Inventor: Takeshi Ito, Hino (JP)

(73) Assignee: Olympus Corporation, Tokyo (JP)

( * ) Notice: Subject to any disclaimer, the term of this patent is extended or adjusted under 35 U.S.C. 154(b) by 189 days.

(21) Appl. No.: 10/898,912

(22) Filed: Jul. 26, 2004

(65) Prior Publication Data

US 2005/0023450 A1 Feb. 3, 2005

(30) Foreign Application Priority Data

Jul. 28, 2003 (JP) ............... 2003-202530

(51) Int. Cl.
*G01D 5/34* (2006.01)
(52) U.S. Cl. .................. 250/231.13; 250/239
(58) Field of Classification Search ........... 250/231.13, 250/239, 216, 231.16
See application file for complete search history.

(56) References Cited

U.S. PATENT DOCUMENTS 5,666,196 A * 9/1997 Ishii et al. ............... 356/499

6,603,114 B1 8/2003 Holzapfel et al.
6,713,756 B2 3/2004 Yamamoto et al.

FOREIGN PATENT DOCUMENTS

| JP | 2000-193417 | 7/2000 |
|---|---|---|
| JP | 2002-542616 | 12/2002 |
| JP | 2003-130689 | 5/2003 |

* cited by examiner

*Primary Examiner*—Que T. Le
(74) *Attorney, Agent, or Firm*—Scully, Scott, Murphy & Presser, P.C.

(57) ABSTRACT

A reflective type optical encoder has a light source, a scale which moves relatively with respect to the light source and which has a periodic optical pattern, and a photodetector which can detect a change in an intensity pattern of a light beam that is emitted from the light source and is reflected and modulated by the scale. The photodetector and a concave portion are formed on a semiconductor substrate, the light source is disposed at the concave portion on the semiconductor substrate, a slit is also disposed on the concave portion, and the light beam emitted from the light source irradiates the scale after passing through the slit.

26 Claims, 18 Drawing Sheets

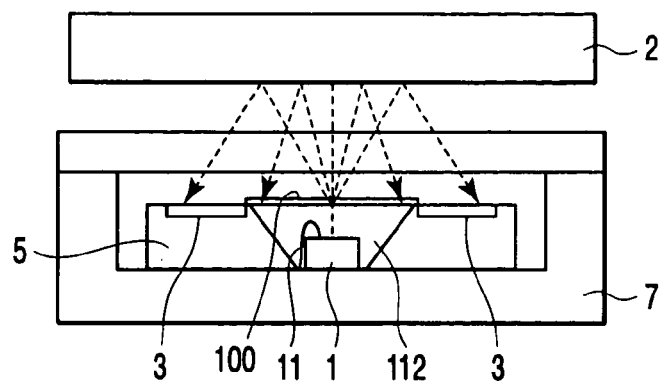
F I G. 7
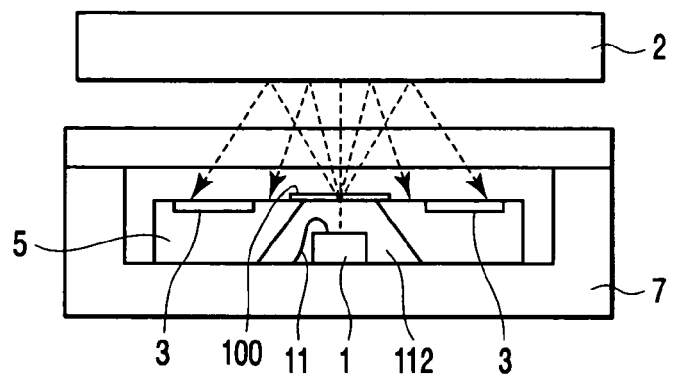
F I G. 8
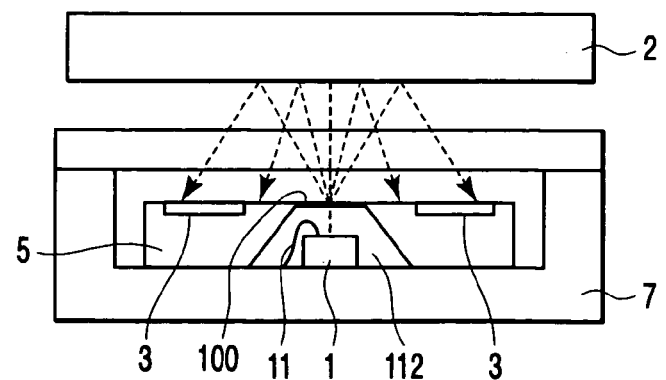
F I G. 9

OPTICAL ENCODER HAVING A LIGHT SOURCE SCALE AND PHOTODETECTOR AND AN OPTICAL LENS MODULE USING THE OPTICAL ENCODER

CROSS-REFERENCE TO RELATED APPLICATIONS

This application is based upon and claims the benefit of priority from prior Japanese Patent Application No. 2003-202530, filed Jul. 28, 2003, the entire contents of which are incorporated herein by reference.

BACKGROUND OF THE INVENTION

1. Field of the Invention

The present invention relates to an optical encoder and an optical lens module.

2. Description of the Related Art

At present, a so-called encoder of an optical type, a magnetic type or the like for detecting a rectilinear displacement amount in a machine tool stage, a three-dimensional measuring instrument and the like, or for detecting a rotational angle in a servomotor and the like, is used.

The optical encoder is generally composed of a scale fixed to a member for detecting the displacement of the stage or the like, and a sensor head for detecting the displacement of the scale. The sensor head has a light emitting portion for irradiating light on the scale, and a light receiving portion for detecting a light beam modulated by the scale, and the movement of the scale is detected in accordance with an intensity change of a received light beam.

As a first prior art, a typical optical encoder will be described with reference to FIG. 33. FIG. 33 is a constitution diagram showing an optical encoder according to a prior art, using a surface emitting laser and a reflective type scale.

This optical encoder using a surface emitting laser and a reflective type scale is disclosed, for example, in U.S. Pat. No. 6,713,756.

As shown in FIG. 33, this encoder is configured by a reflective type scale 20 and a sensor head 30. A displacement amount detecting optical pattern 23 and a reference position detecting optical pattern 24 are formed on the surface of the scale 20, and these patterns are formed by patterning a metallic thin film such as chromium or the like on the surface of a transparent member such as a glass. In the sensor head 30, a displacement amount detecting photodetector 37 and a reference position detecting photodetector 39 are formed on a semiconductor substrate 34, a surface emitting laser 32 is disposed on the semiconductor substrate 34, and the positional relationship of a light source 32, and the photodetectors 37 and 39 is kept constant.

The scale 20 is interlocked with a stage (not shown) or the like, and moves relatively in the direction of the arrow of FIG. 33 with respect to the sensor head 30, and the sensor head 30 detects a movement amount, a moving direction, and a reference position thereof on the basis of an intensity change of the light beam modulated by the scale 20. The output signals from the sensor head are output as waveforms, for example, as those of FIG. 35. Here, A-phase and B-phase are waveforms which are output along with the movement of the scale 20, and are generally quasi sinusoidal waves. Further, Z-phase is a signal to be output when a reference position is detected. The A-phase and the B-phase are signals deviating from each other by 90 degrees in phase, and it is possible to detect the moving direction of the scale 20 on the basis of the phase relationship between the signals of the A-phase and the B-phase.

In this prior art, because the scale 20 displaces with respect to the sensor head 30 while maintaining a positional relationship by which a so-called Talbot image can be formed, a bright/dark pattern similar to a periodic pattern of the scale 20 is projected on the movement amount detecting photodetector 37, and the bright/dark pattern moves on the photodetector 37 along with the movement of the scale 20.

The Talbot image will be described by using FIG. 34. Here, the description will be carried out by supposing a transmission type encoder in order to simplify the description. However, the completely same argument is achieved with respect to the reflective type encoder as well.

As shown in FIG. 34, respective constituting parameters will be defined as follows.

z0: distance between the light source 1 and the surface of the scale 2 on which diffraction grating is formed z2: distance between the surface of the scale 2 on which diffraction grating is formed and the photodetector 3 p1: pitch of the diffraction grating on the scale 2 p2: pitch of the bright/dark pattern to be projected on the light receiving surface of the photodetector 3

In accordance with optical diffraction theory, when z0 and z2 defined as described above are in or close to a specific relationship satisfying the relationship shown by the following equation (1), a bright/dark pattern similar to the diffraction grating pattern of the scale 2, i.e., a Talbot image is formed on the light receiving surface of the photodetector 3:

$$(1/z0)+(1/z2)=\lambda k/(p1)^2 \qquad (1)$$

where, $\lambda$ denotes a wavelength of a light beam emitted from a light source, and k denotes an integer.

In this case, the pitch p2 of the diffraction interference pattern on the light receiving surface can be determined by the following equation (2).

$$P2=p1\times(z0+z2)/z0 \qquad (2)$$

When the scale 2 is displaced in the pitch direction of the diffraction grating with respect to the light source 1, the bright/dark pattern projected on the photodetector 3 moves in a displacement direction of the scale 2 with the same space period being kept.

Therefore, provided that a period p20 of a light receiving portion 4 of the photodetector 3 is set to the same value as that of the pitch p2 of the bright/dark pattern determined by the equation (2), because a periodic intensity signal is obtained from the photodetector 3 every time the scale 2 moves by p1 in the pitch direction, the displacement amount of the scale 2 in the pitch direction can be detected.

Returning to FIG. 33 to continue the description, because the surface emitting laser light source 32, and the periodic optical pattern 23 and the photodetector 37 are disposed so as to have a positional relationship in which the above-described Talbot image can be formed and detected, the bright/dark pattern similar to the periodic optical pattern 23 formed on the scale 20 is projected on the photodetector 37. The period of the bright/dark pattern is the period p2 calculated by equation (2), and the photodetector 37 is formed so as to have the period of this p2. Accordingly, a movement of the bright/dark pattern can be detected by the photodetector 37.

Next, a second prior art will be described with reference to FIG. 36. FIG. 36 shows an encoder according to the prior art, in which the light source 1 is disposed at the side opposite to the scale with respect to the semiconductor substrate 5 on which the photodetector 3 is formed.

This encoder in accordance with the second prior art is disclosed, for example, in U.S. Pat. No. 6,603,114.

As shown in FIG. 36, in this encoder, the photodetector 3, a slit 100, and a blind hole 1000 are formed at a semiconductor substrate 5, and the light source 1 is disposed at the side opposite to the scale 2 so as to provide the slit 100 therebetween. The slit 100 is disposed at the depth of the blind hole 1000. This slit 100 is formed from a metallic film 74, and the metallic film 74 is sandwiched from the upper and lower portions by translucent films 76 such as a silicon oxide film.

It is configured such that the light beam emitted from the light source 1 passes through the translucent portion of the slit 100 formed in the depth of the blind hole 100, and irradiates the scale 2, and a signal light modulated by the scale 2 is detected by the photodetector 3 formed on the semiconductor substrate 5. Accordingly, it is configured such that a movement of the scale 2 can be detected on the basis of an intensity change of the signal light.

Because the optical encoder has the features of being highly precise, having a high resolution, being a non-contact type, and being superior in resistance to electromagnetic radiation problems, the optical encoder is utilized in various fields, and especially an encoder requiring high precision and high resolution is mainly of an optical type.

BRIEF SUMMARY OF THE INVENTION

A first aspect of the present invention relates to a reflective type optical encoder comprising: a light source; a scale which moves relatively with respect to the light source and which has a periodic optical pattern; and a photodetector which can detect a change in an intensity pattern of a light beam that is emitted from the light source and is reflected and modulated by the scale, wherein the photodetector and a concave portion are formed on a semiconductor substrate, the light source is disposed at the concave portion on the semiconductor substrate, a slit is also disposed on the concave portion, and the light beam emitted from the light source irradiates the scale after passing through the slit.

A second aspect of the present invention relates to a reflective type optical encoder comprising: a light source; a scale which moves relatively with respect to the light source and which has a periodic optical pattern; and a photodetector which can detect a change in an intensity pattern of a light beam that is emitted from the light source and is reflected and modulated by the scale, wherein the photodetector and a through hole are provided on a semiconductor substrate, and the light source is disposed in the through hole.

A third aspect of the present invention relates to a reflective type optical encoder comprising: a light source; a scale which moves relatively with respect to the light source and which has a periodic optical pattern; and a photodetector which can detect a change in an intensity pattern of a light beam that is emitted from the light source and is reflected and modulated by the scale, wherein the photodetector is configured of at least two photodetectors respectively formed separate semiconductor substrates, the at least two photodetectors are disposed on a common substrate such that respective light receiving surfaces thereof are made to face a surface of the scale, and the light source is fixed on the common substrate between the at least two photodetectors.

A fourth aspect of the present invention relates to an optical lens module for carrying out detection of a position of a movable lens by using an optical encoder which comprises: a light source; a scale which moves relatively with respect to the light source and which has a periodic optical pattern; and a photodetector which can detect a change in an intensity pattern of a light beam that is emitted from the light source and is reflected and modulated by the scale, the optical encoder further having the photodetector and a through hole on a semiconductor substrate, wherein the light source is disposed in the through hole, a slit is disposed on the through hole of the semiconductor substrate, and a light beam emitted from the light source irradiates the scale after passing through the slit.

A fifth aspect of the present invention relates to an optical lens module for carrying out detection of a position of a movable lens by using a reflective type optical encoder comprises: a light source; a scale which moves relatively with respect to the light source and which has a periodic optical pattern; and a photodetector which can detect a change in an intensity pattern of a light beam that is emitted from the light source and is reflected and modulated by the scale, wherein the photodetector is configured of at least two photodetectors respectively formed separate semiconductor substrates, the at least two photodetectors are disposed on a common substrate such that respective light receiving surfaces are made to face a surface of the scale, the light source is fixed on the common substrate between the at least two photodetectors, the at least two photodetectors have substantially the same thickness, and a slit is disposed so as to extend over the at least two photodetectors between the light source and the scale.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a diagram showing a configuration of an optical encoder according to a third embodiment of the present invention.

FIG. 8 is a diagram showing a modified example of the third embodiment of the invention.

FIG. 9 is a diagram showing a configuration of an optical encoder according to a fourth embodiment of the present invention.

DETAILED DESCRIPTION OF THE INVENTION

Hereinafter, embodiments of the present invention will be described in detail with reference to the attached drawings.

(First Embodiment)

A first embodiment of the present invention will be described with reference to FIGS. 1 to 3, 22 and 28.

Figure 1:
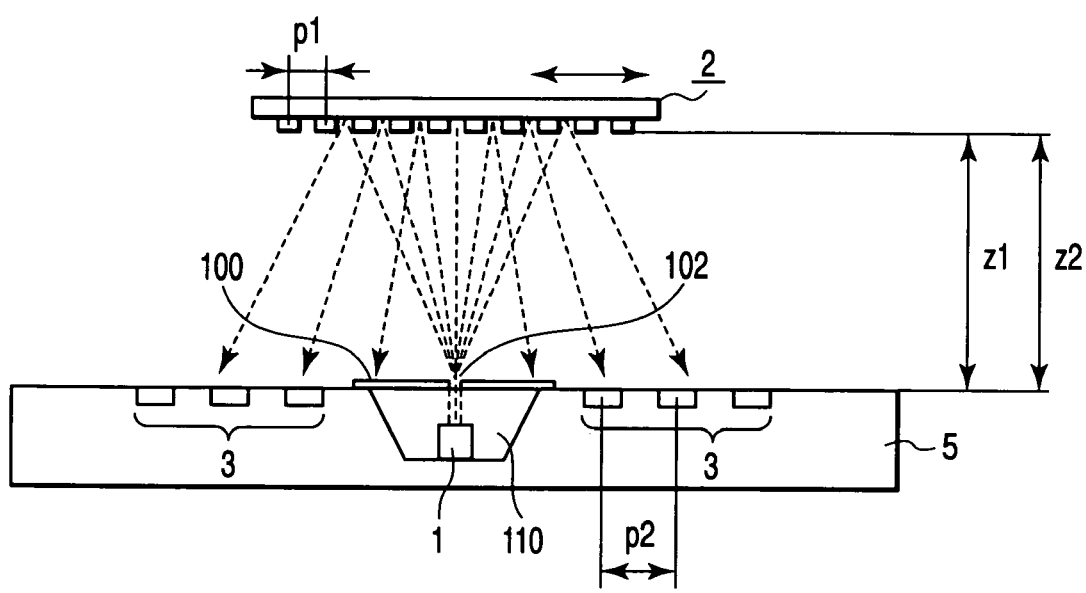
FIG. 1 is a diagram showing a configuration of an optical encoder according to a first embodiment of the present invention.

FIG. 1 is a diagram showing a configuration of an optical encoder according to the first embodiment of the present invention. This optical encoder is configured such that a concave portion 110 is provided at a semiconductor substrate 5 having a photodetector 3, a light source 1 is disposed in the concave portion 110, and a slit 100 is disposed on the concave portion 110 at the side at which the photodetector 3 of the semiconductor substrate 5 is formed. The light source 1 is a coherent light source, and is an LED for emitting a light beam of a wavelength $\lambda$. The scale 2 is a reflective type scale having a scale pitch p1. The slit 100 is configured such that a slit opening 102 which is mostly the same as the scale pitch p1 is formed at a metallic plate, and the opening 102 is a through hole.

A light beam emitted from the light source 1 passes through the opening 102 of the slit 100, and irradiates the scale 2. Then, the light beam modulated by the scale 2 is incident upon the photodetector 3, and the movement of the scale 2 can be detected on the basis of the intensity change thereof.

Next, operation of the optical encoder having the configuration described above will be described. The light beam emitted from the light source 1 proceeds toward the slit 100, and the light beam having passed through the opening 102 of the slit 100 irradiates the scale 2. At this time, because the light having passed through the opening 102 of the slit 100 proceeds toward the scale 2 to be spherical wave with the opening 102 being served as a virtual point light source, the opening 102 can be considered a virtual point light source.

The light beam having passed through the slit opening 102 is irradiated on the scale 2, and the light beam modulated by the scale 2 is made to be a bright/dark pattern similar to a periodic pattern which the scale 2 has, and is projected on the photodetector 3. At this time, given that a distance from the slit 100 to the scale 2 is z1, a distance from the scale 2 to the photodetector 3 is z2, and a wavelength of the light beam emitted from the light source 1 is $\lambda$, a pitch of the periodic pattern of the scale 2 is p1, and k is an integer, when the following equation (3) is satisfied, the bright/dark pattern similar to the pattern of the scale is projected on the photodetector 3. This bright/dark pattern is generally called a Talbot image when the light source is a point light source.

$$(1/z1)+(1/z2)=\lambda/k(p1)^2 \qquad (3)$$

Here, pitch p2 of the bright/dark pattern projected on the light receiving surface can be expressed as shown by the following equation (4).

$$P2=p1\times(z1+z2)/z1 \qquad (4)$$

Here, in the present embodiment, because it is configured such that z1 and z2 are made to be the same, given that this value is z1=z2=z, the following relationship is derived.

$$z=(2k(p1)^2/\lambda) \qquad (3')$$

$$P2=2\times p1 \qquad (4')$$

Namely, under the condition that the condition of (3') is satisfied, the pitch p2 of the bright/dark pattern projected on the photodetector 3 is always twice the scale pitch p1. Here, the condition of (3') means that the contrast of the bright/dark pattern is made to be a maximum at this position, and it is not necessarily that this condition is perfectly satisfied. With respect to the value of z, the bright/dark pattern can be observed even at a position shifted from the value.

Accordingly, in the present embodiment, it is configured such that the bright/dark pattern can be detected even when z is made to be higher or lower to some extent centering on the value of z calculated by the above-described (3'). As a result of our experiments, with respect to a tolerance of the z, given that the scale pitch $p1=20$ μm, the light source wavelength $\lambda=850$ μm, when $k=2$, z was about 1.7 mm±0.5 mm.

In accordance with the above description, the present embodiment is configured such that, even when a gap between the scale 2 and the sensor head changes, the pitch p2 of the bright/dark pattern to be projected on the photodetector 3 is made to be always twice the scale pitch p1, and it is a configuration which is tolerant for the gap fluctuation. Further, because the opening 102 is a through hole, refraction, scattering, or the like at the through hole does not arise.

Next, a method of manufacturing an encoder head according to the present embodiment shown in FIG. 1 will be described. First, the photodetector 3 is manufactured on the semiconductor substrate 5 by a general technique. At this time, a driving circuit for the light source 1, a signal processing circuit such as an I-V converting circuit or a signal amplifying circuit, or the like may be manufactured as needed in the same way on the semiconductor substrate 5. The concave portion 110 is formed on the surface on which the photodetector 3 of the semiconductor substrate 5 is formed so as to be deeper than the thickness of the light source 1. The concave portion 110 can be formed by dry etching, or wet etching or the like onto the semiconductor substrate 5 as the method for forming the concave portion 110.

Next, a pair of electrode patterns for electrically connecting to the upper and lower electrodes of the light source 1 are formed in the concave portion 110, and the light source 1 is disposed such that one of the electrode patterns and the lower electrode of the light source 1 are electrically connected to one another. Next, an electric wiring is connected to the light source 1 such that the other electrode pattern and the upper electrode of the light source 1 are electrically connected to one another. At this time, the electric wiring 11 is formed so as to be not projected from the concave portion 110.

After the connecting process of the electric wiring is completed, the slit 100 is fixed on the concave portion 110 of the semiconductor substrate 5 as shown in FIG. 1. At this time, the opening 102 of the slit 100 is disposed such that the longitudinal direction of the slit 102 is substantially perpendicular to the moving direction of the scale within the surface on which the photodetector 3 is formed on the semiconductor substrate 5.

In this way, the sensor head having the photodetector 3, the slit 100, and the light source 1 is assembled. At this time, although not shown in FIG. 1, a base material for fixing a sensor head, a protective material, a wiring member, and the like can be appropriately attached thereto as needed.

Figure 28:
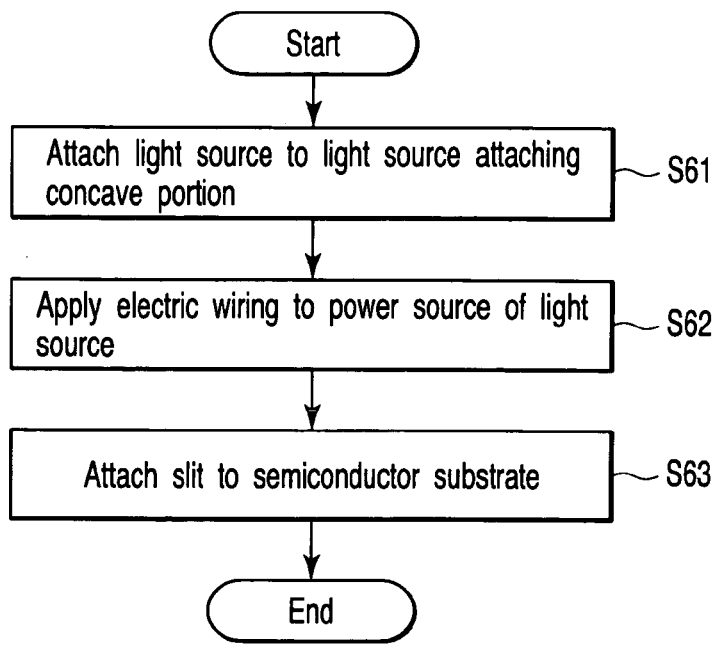
FIG. 28 is a flowchart for explaining operation of the first embodiment of the invention.

The method of manufacturing the encoder head according to the present embodiment described above can be summarized as in the flowchart of FIG. 28. First, the light source 1 is fixed at the concave portion 110 formed on the semiconductor substrate 5 (step S61). Next, electric wiring is applied to the electrode of the light source 1 fixed on the semiconductor substrate 5 to make it possible to emit light (step S62). Next, the slit 100 is fixed on the semiconductor substrate 5 such that at least some of the light beam emitted from the light source 1 passes through the slit 100 and irradiates the scale 2 (step S63).

Next, the photodetector 3 in the present embodiment will be described. The photodetector 3 for use in the present embodiment is composed of a light receiving portion group that a plurality of light receiving portions 4 are one-dimensionally arranged. The respective light receiving portions 4 are grouped into four groups +A, +B, −A, and −B electrically connected respectively at every period p2 such that four phase portions which deviate from each other by 90 degrees in phase, of the bright/dark pattern having periods p2 can be detected. Signals detected by these four groups deviate from each other by 90 degrees in phase, and for example, (+A) and (−A) are in the relationship of inverted signals which deviate from each other by 180 degree in phase.

Figure 35:
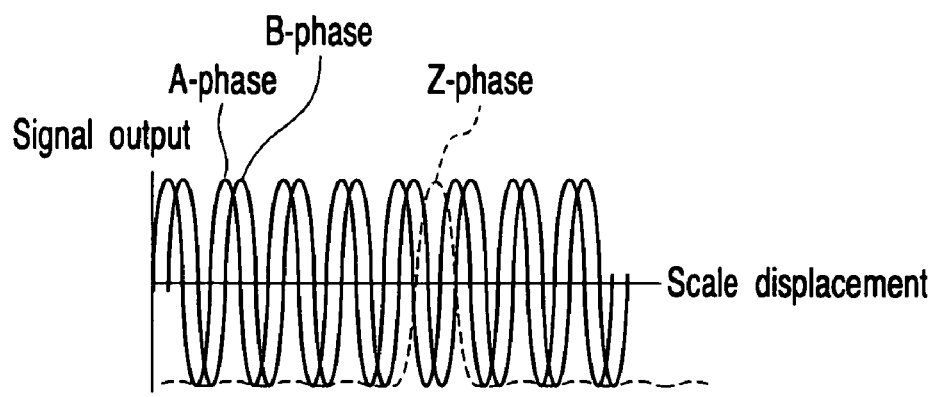
FIG. 35 is a diagram showing waveforms of an output signal form a sensor head.
Figure 36:
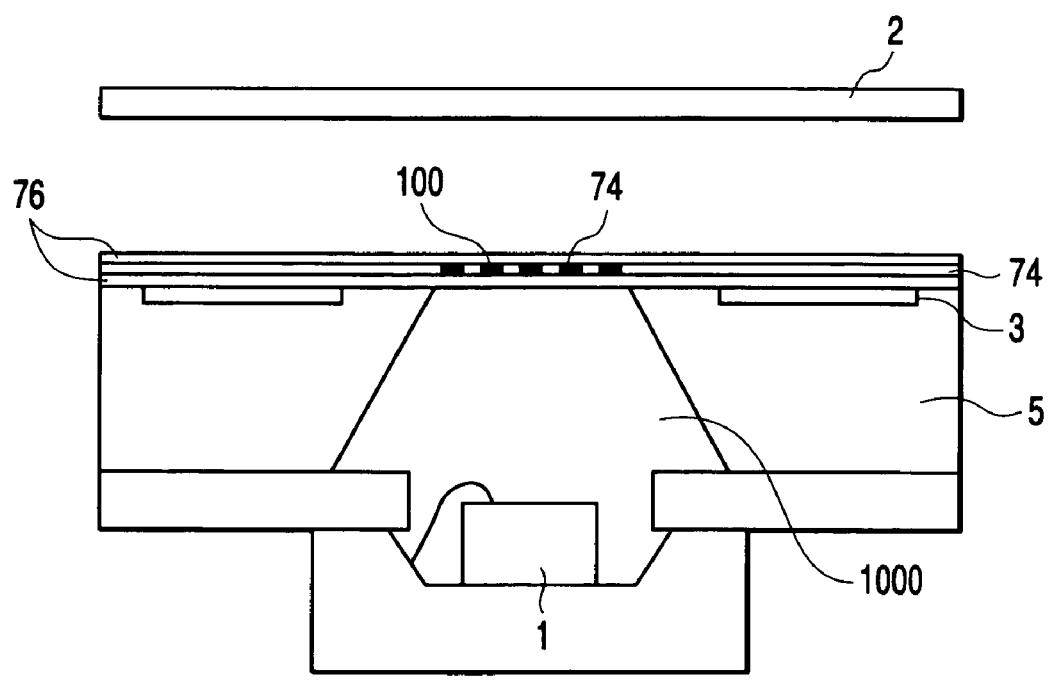
FIG. 36 is a diagram for explaining a second prior art.

Then, an A-phase signal and a B-phase signal in FIG. 35 are calculated and outputted by a signal processing circuit (not shown) such that A-phase signal=(+A)−(−A) and B-phase signal=(+B)−(−B). Here, in the present embodiment, the photodetector 3 in which the light receiving portions 4 are one-dimensionally arranged at the period p2 is supposed. However, in practical use, any of configurations may be applied if a predetermined phase portion at the period p2 can be detected. Namely, some of the light receiving portions 4 arranged at the period p2 can be selected and used. For example, when the light receiving portions 4 are selected every other one, the light receiving portions 4 have a period which is twice the period p2, and it may be applied. Moreover, the light receiving portions 4 have a period which is integral times the period p2 can be used. Further, there is no need to select so as to have a periodicity. However, a width along the moving direction of the scale of the photodetector 3 must be less than or equal to the period p2, and preferably, must be less than or equal to the half of the period p2.

By configuring the photodetector 3 as described above, even when a gap between the sensor head and the scale 2 fluctuates, the pitch p2 of the bright/dark pattern to be projected on the photodetector 3 is made to be always twice the scale pitch. Therefore, a configuration which is hard to be affected by the gap fluctuation can be provided. Further, the opening 102 of the slit 100 is a through hole, and because a transparent member or the like is not disposed thereat, there is no case in which the opening 102 is not affected by reflection, scattering, refraction, or the like at this region, and a stable bright/dark pattern can be projected on the photodetector 3.

Figure 2:
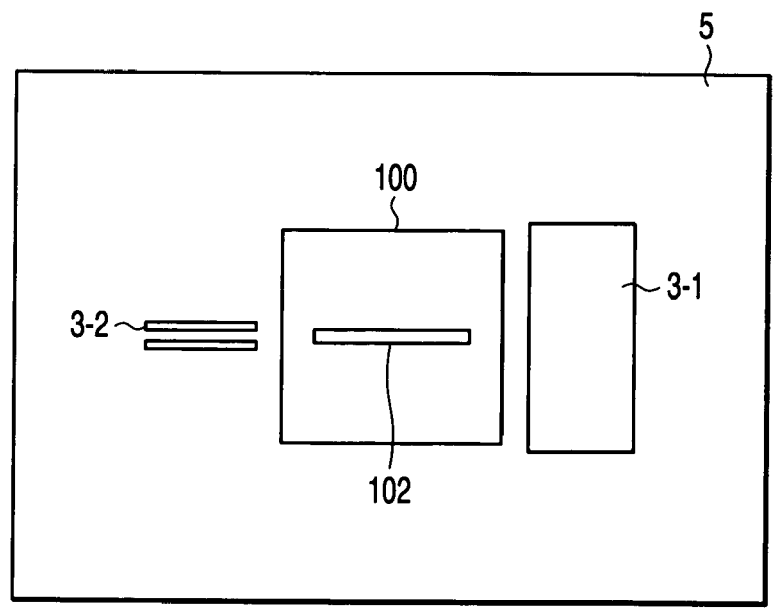
FIG. 2 is a diagram for explaining one example of a layout of a photodetector.
Figure 22:
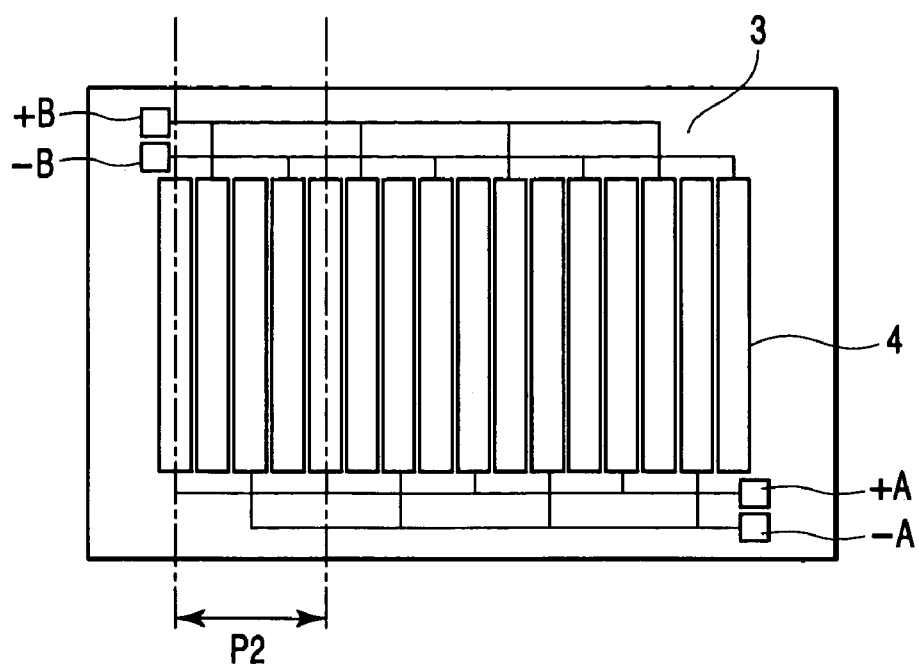
FIG. 22 is a diagram showing a concrete configuration of a photodetector.

Note that, in the present embodiment, a plurality of photodetectors 3 can be disposed so as to provide the slit 100 therebetween. At this time, for example, at one of the photodetectors 3, a plurality of photodetectors for detecting the same bright/dark pattern as shown in FIG. 22 may be disposed. In addition, as shown in FIG. 2, a photodetector 3-1 disposed at the right side of the slit 100 is a photodetector, which is typified in FIG. 22, for detecting a bright/dark pattern and a photodetector 3-2 disposed at the left side of the slit 100 may be a photodetector for detecting a reference positional pattern formed on the scale 2. In the following description, the photodetector 3-1 and the photodetector 3-2 are not distinguished from each other, and are generally called the photodetectors 3.

Figure 3:
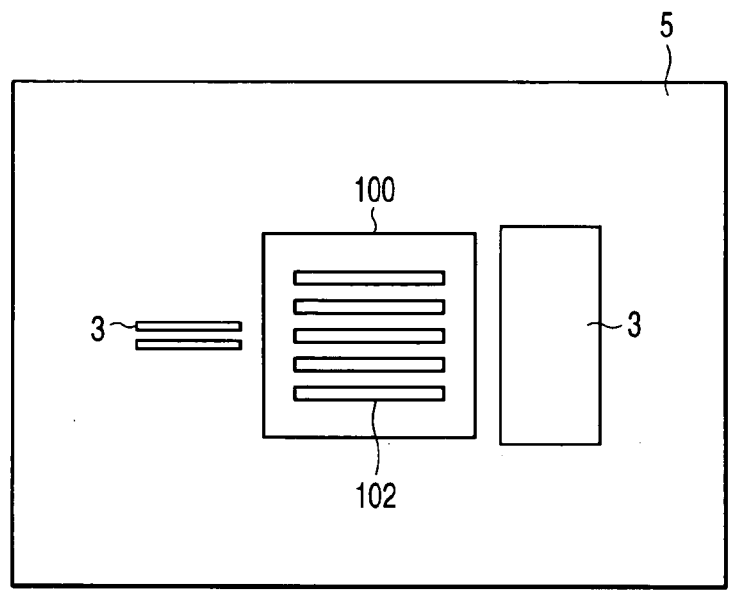
FIG. 3 is a diagram showing a modified example of the first embodiment.
Figure 4:
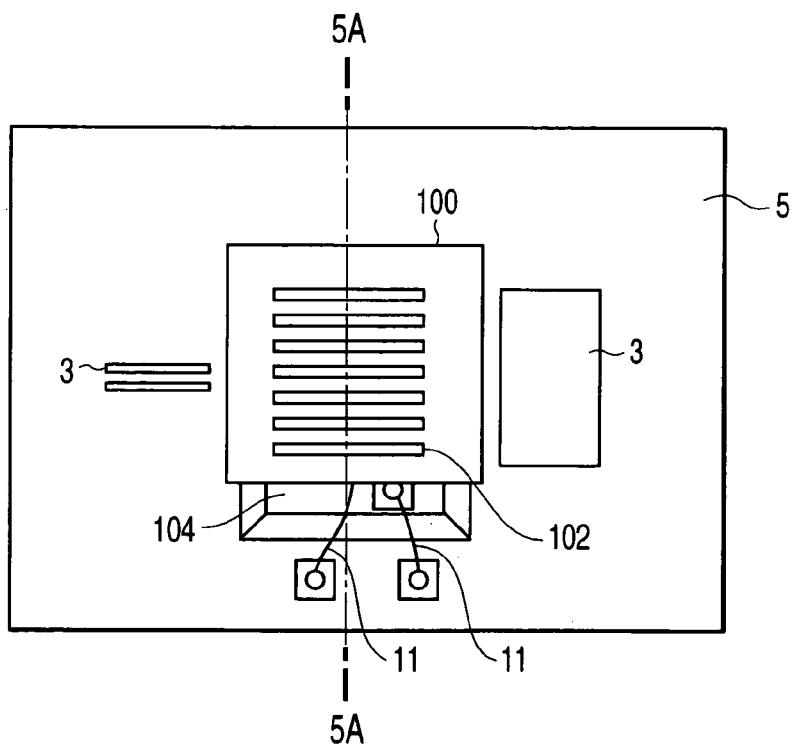
FIG. 4 is a diagram showing a configuration of a second embodiment in which a slit 100 has an opening 104.

Further, as shown in FIG. 3, it goes without saying that the slit 100 may have a plurality of openings 102. At this time, it is necessary to determine a pitch among the plurality of slits 100 on the basis of the scale pitch. In the present embodiment, the slit pitch is formed so as to have openings at a position twice the scale pitch. Here, the position twice the scale pitch means that some of the slit openings 120 having a pitch twice the scale pitch are selected.

For example, the slit 100 in which the slit openings 120 formed at a pitch which is twice the scale pitch are selected at every second opening has a slit pitch which is four times the scale pitch. However, because all of those are included within the position which is twice the scale pitch, the slit 100 can be defined as a slit having the openings at the positions which are twice the scale pitch.

Namely, a slit which is integral times the scale pitch can be said a slit having the openings at the positions which are twice the scale pitch. Further, in this definition, it goes without saying that there is no need for the positions of the slit openings 102 to be selected to have a periodicity. Note that, in this case as well, the width of the slit opening 102 must be less than or equal to twice the scale pitch, and is preferably less than or equal to the scale pitch.

Note that, in the present embodiment, the slit in which a through hole is formed at the metallic plate by etching or the like is used as the slit 100. However, the slit 100 may be a slit having a through hole wherein resin or the like is molded, and a slit which is a type by patterning onto a glass plate with a metal or the like can be used.

Moreover, the slit may be a slit in which patterning is applied onto a transparent PET film. The PET film can be used as a base material as a scale or a slit because the coefficient of thermal expansion is relatively small as resin, and further, from the standpoints of hardness, optical characteristics, and the like. In such a case, there is not a thorough hole, but a glass or a PET film at the slit opening, and the optical characteristics thereof are by far uniform and stable as compared with the silicon oxide film formed by the semiconductor process as the problems in the prior art. Further, it is easy to form antireflection coatings on the slit surface, which does not inhibit any of the features of the present embodiment.

(Second Embodiment)

Next, a second embodiment of the present invention will be described with reference to FIGS. 4 to 6, and 30.

In the present embodiment, the respective members are configured in the same manner as in the first embodiment of the invention shown in FIG. 1, and the basic operation is the same as that of the first embodiment.

The second embodiment differs from the first embodiment in that the slit 100 disposed on the light source 1 has an opening 104. In the second embodiment, the operation as an encoder is not different from that of the first embodiment at all. However, due to the opening 104 being provided, it is easy to apply electric wiring to the light source 1.

Figure 5A:
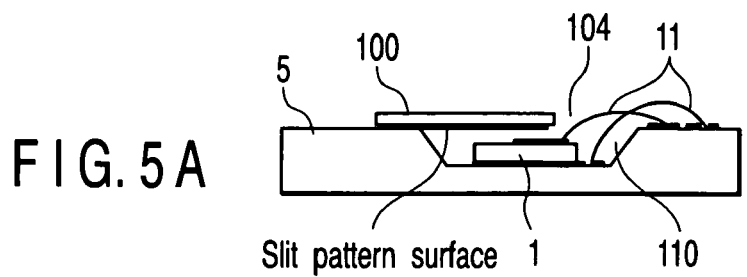
FIG. 5A is a diagram showing a cross-section taken along line A–A' of FIG. 4.

FIG. 5A is a diagram showing an A–A' cross-section. The electric wiring 11 of the light source 1 is connected to the electrode provided on the surface of the semiconductor substrate 5 via the opening 104.

Hereinafter, a method of manufacturing an encoder according to the second embodiment will be described. First, the photodetector 3 is manufactured by a general technique, and a driving circuit for a light source and a signal processing circuit are manufactured as needed, on the semiconductor substrate 5. The concave portion 110 is formed at the surface on which the photodetector 3 of the semiconductor substrate 5 is formed so as to be deeper than the thickness of the light source 1. The concave portion 110 can be formed by dry etching, wet etching, or the like onto the semiconductor substrate 5 as the method for forming the concave portion 110.

Next, at least one of electrode patterns electrically connected to the lower electrode of the light source 1 is formed in the concave portion 110, and the light source 1 is disposed such that the electrode pattern and the lower electrode of the light source 1 electrically contact one another. Next, the slit 100 is fixed on the concave portion 110 of the semiconductor substrate 5. At this time, it is necessary to fix the slit 100 such that electric wiring is made possible via the opening 104. Next, the electric wiring 11 is connected between the upper electrode of the light source 1 and an electrode for being electrically connected to the upper electrode of the light source 1 formed on the semiconductor substrate 5. After the electric wiring process is completed, although not shown in the drawing, a base material for fixing a sensor head, a protective material, a wiring member, and the like can be appropriately attached thereto as needed.

In accordance with the encoder being formed, the electric wiring 11 can be applied after the slit 100 has been fixed, and the wiring process can be collectively achieved at the time of manufacturing thereof. Further, there is no need to form an electrode pattern so as to be over from the inside of the concave portion 110 of the semiconductor substrate 5 to the surface of the semiconductor substrate 5, and so as to derive the electric wiring 11 from the upper electrode of the light source 1 from the concave portion 110. Moreover, the risk of the wire connected to the upper electrode of the light source 1 and the slit contacting one another is reduced.

Figure 5B:
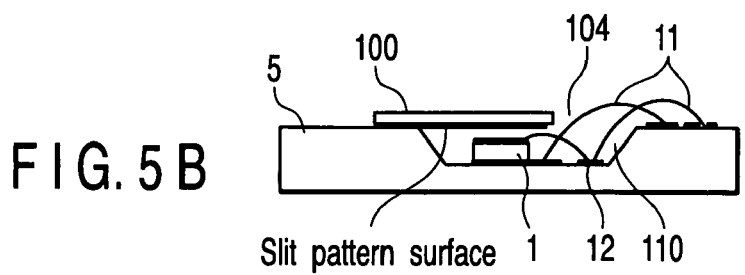
FIG. 5B is a diagram showing a modified example of the second embodiment.
Figure 6:
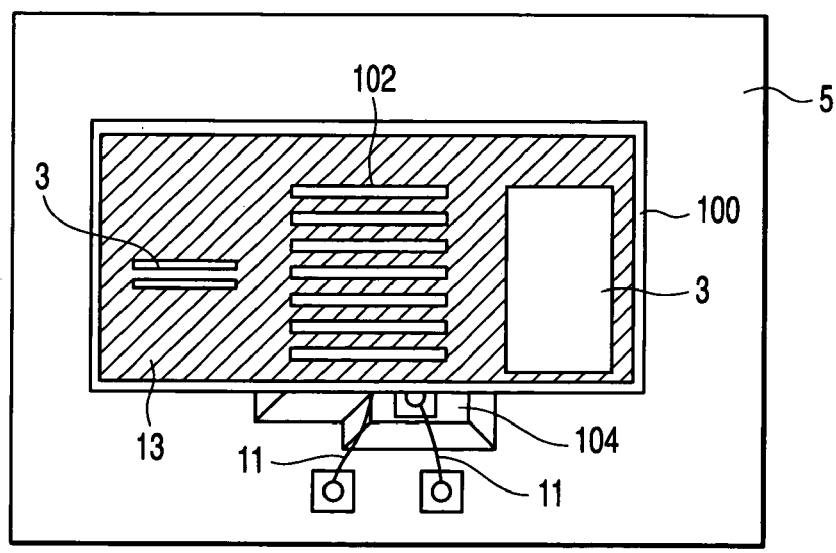
FIG. 6 is a diagram showing a modified example of the second embodiment of the invention.

Further, in order to dispose the slit at a sufficient area on the light source 1, a method is possible in which wiring is applied due to a relay electrode 12 being provided at the inside of the concave portion 110 of the semiconductor substrate 5, and due to the wiring electrode from the upper portion of the light source being once relayed as shown in FIG. 5B. Moreover, in order to make the opening 104 as small as possible, a shape of the concave portion 110 can be appropriately adjusted. For example, in order to make a portion which is not covered with the slit 100 small, the shape of the concave portion 110 can be made to be, not a simple quadrangle, but a polygon as shown in FIG. 6.

Further, in the present embodiment, the encoder is supposed to be a type in-which the concave portion is provided on the semiconductor substrate 5. However, even if the encoder is a type in which a through hole 112 is provided, and the light source 1 is disposed at the through hole 112 as shown in FIG. 8, the same effects can be obtained.

Figure 30:
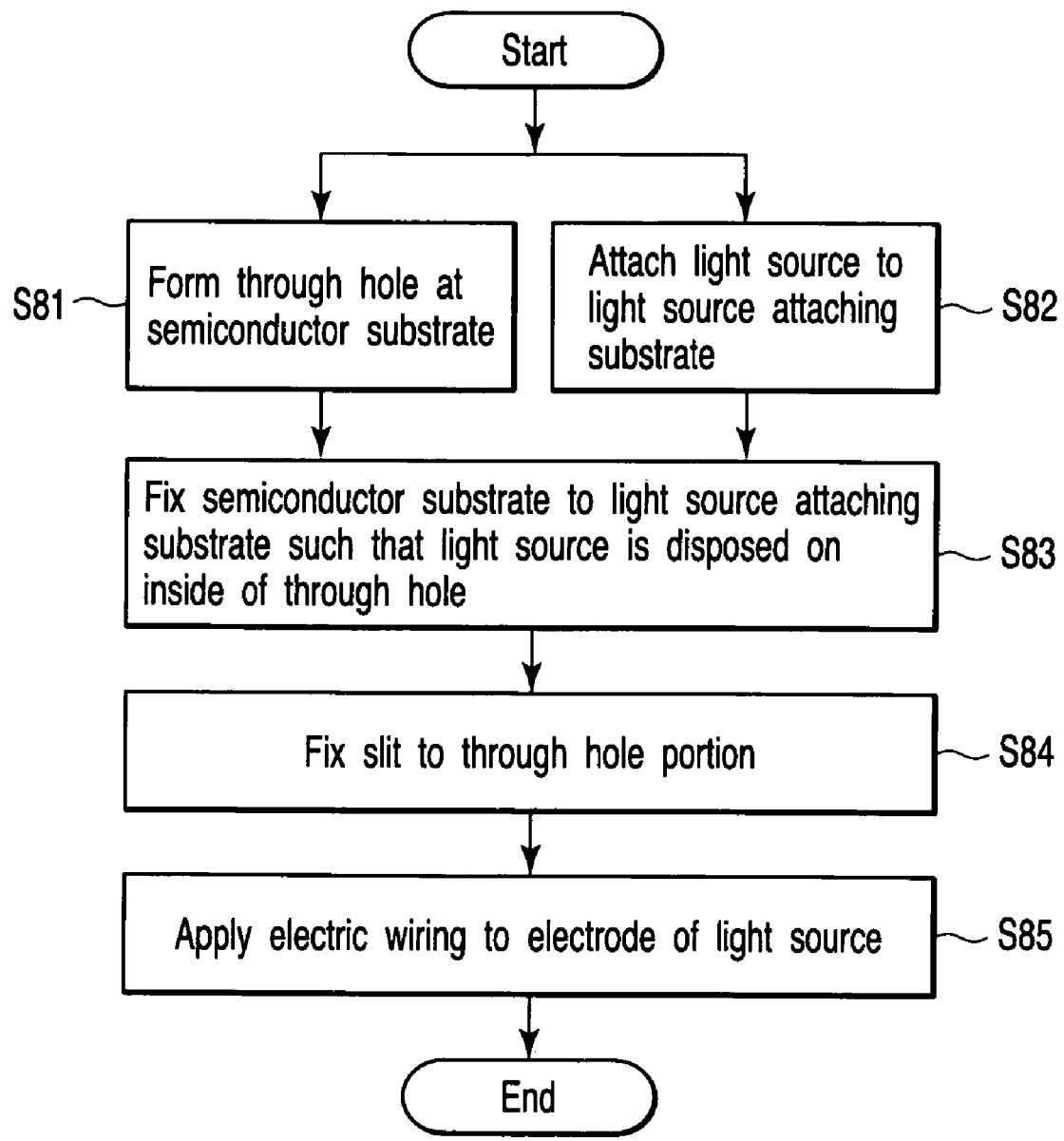
FIG. 30 is a flowchart for explaining operation of the second embodiment of the invention.

Hereinafter, a method of manufacturing an encoder head having the through hole 112 will be described with reference to the flowchart of FIG. 30. First, a through hole is formed at the semiconductor substrate 5 (step S81). Next, the light source 1 is attached to a light source attaching substrate (step S82). Next, the semiconductor substrate 5 is fixed to the light source attaching substrate such that at least a part of the light source is disposed at the inside of the through hole (step S83). Next, the slit 100 is fixed to the though hole portion such that at least some of a light beam emitted from the light source 1 is irradiated on the scale 2 after passing through the slit 100 (step S84). Next, electric wiring is applied to the electrode of the light source 1 fixed to the light source attaching substrate to make it possible to emit light (step S85).

Note that, in the present embodiment, as the slit, various slits such as a slit in which patterning is applied onto a glass plate with a metallic film or the like, a slit in which penetration etching is applied to a metallic plate, or the like, may be utilized. Further, when a slit in which patterning is applied onto a glass plate is used, as shown in FIG. 5, the slit pattern surface is preferably made to be at the light source side such that the photodetector and the slit are made to be the same plane.

By configuring the encoder as described above, the first embodiment is maintained as is, and an optical encoder which is more easily assembled and manufactured, and a method of manufacturing the same can be provided.

(Third Embodiment)

Next, a third embodiment of the present invention will be described with reference to FIGS. 7, 8, 23, and 29.

In the present embodiment, the respective members are configured in the same manner as in the first embodiment of the present invention shown in FIG. 1, and the basic operation is the same as that of the first embodiment.

The third embodiment differs from the first embodiment in that the semiconductor substrate 5 has the through hole 112, and the light source 1 and the semiconductor substrate 5 are fixed to a common substrate 7. In the third embodiment, the operation as an encoder is not different from that of the first embodiment at all. However, because of the configuration in which the light source 1 is fixed to, not the concave portion 110 of the semiconductor substrate 5, but the semiconductor substrate 7, controlling of the depth of the concave portion 110 when the concave portion 110 is formed at the semiconductor substrate 5 and the process of forming the electrodes at the inside of the concave portion 110 are made unnecessary. Therefore, an optical encoder which is more easily assembled and manufactured, and a method of manufacturing the same can be provided.

FIG. 7 is a diagram showing a cross-section of an encoder of the third embodiment. In FIG. 7, the semiconductor substrate 5 has the through hole 112, and the light source 1 is disposed at the inside of the through hole 112. The light source 1 is fixed to the substrate 7 to which the semiconductor substrate 5 is fixed. The electric wiring 11 for electrically connecting to the light source 1 is provided at the substrate 7, and in the present embodiment, the upper electrode of the light source 1 and the electrode provided on the substrate 7 are electrically connected to one another by electric wiring 11. Further, although not illustrated, the lower electrode of the light source 1 and another wiring electrode formed on the substrate 7 are connected to one another directly or via an adhesive layer.

Further, in the present embodiment, the slit 100 is fixed to the surface, on which the photodetector 3 is formed, of the through hole 112. At this time, the slit 100 may be a metal slit in which a through hole is provided at a metallic plate, or a glass slit in which a shielding pattern is provided on a transparent substrate such as a glass plate.

It is configured such that the light beam emitted from the light source 1 passes through the slit 100 and is irradiated on the scale 2, and the light intensity pattern modulated by the slit 2 is detected by the photodetector 3.

Hereinafter, a method of manufacturing an encoder according to the third embodiment will be described. First, the photodetector 3 is manufactured by a general technique, and a driving circuit for the light source 1, the signal processing circuit, and the like are manufactured as needed, on the semiconductor substrate 5. The through hole 112 is formed at the semiconductor substrate 5. The through hole 112 can be formed by dry etching, wet etching, and the like, which are general semiconductor manufacturing techniques. At this time, with respect to the through hole 112, etching may be started from the surface, on which the photodetector 3 is formed, of the semiconductor substrate 5 as shown in FIG. 7, or etching may be carried out from the rear surface as shown in FIG. 8. Moreover, etching can be carried out from the both sides. Next, the light source 1 is disposed at a predetermined position of the substrate 7 to which a wiring pattern which can be electrically connected to the upper and lower electrodes of the light source 1 is applied, and the wiring electrode 11 is connected to the upper electrode. Next, the semiconductor substrate 5 is fixed to the substrate 7 such that the light source 1 is disposed at the inside of the through hole 112 formed at the substrate 5. Here, an electrode is provided at a portion of the substrate 7 contacting the semiconductor substrate 5, and a reference voltage of the semiconductor substrate 5 can be obtained. Note that the electric wiring 11 with respect to the light source 1 is applied to the substrate 7. However, in addition thereto, electric wiring with respect to the semiconductor substrate 5 can be provided. In a case of providing such wiring, after the semiconductor substrate 5 and the substrate 7 are connected to each other, the semiconductor substrate 5 and the semiconductor substrate 7 can be electrically connected to each other.

Note that, in the present method of manufacturing and assembling, a process of disposing the slit 100 on the through hole 112 of the semiconductor substrate 5 is required. However, provided that the through hole 112 has been provided at the semiconductor substrate 5, this process may be carried out before the semiconductor substrate 5 is fixed to the substrate 7, or may be carried out after the semiconductor substrate 5 is fixed to the substrate 7 and the electric wiring 11 is connected thereto.

Figure 29:
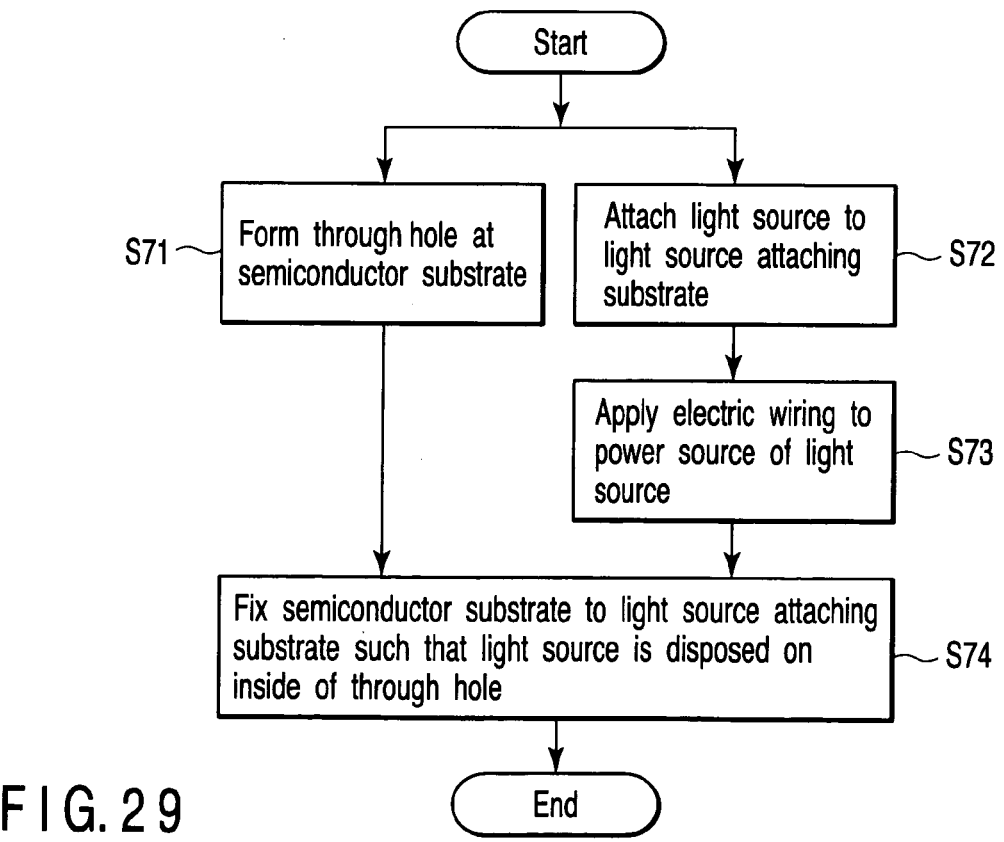
FIG. 29 is a flowchart for explaining operation of the third embodiment of the invention.

The method of manufacturing an encoder head according to the present embodiment described above can be summarized as in the flowchart of FIG. 29. First, the through hole 112 is formed at the semiconductor substrate 5 (step S71). At the same time, the light source 1 is attached to the light source attaching substrate 7 (step S72). Next, the electric wiring 11 is applied to the electrode of the light source 1 fixed on the light source attaching substrate 7 to make it possible to emit light (step S73). Next, the semiconductor substrate 5 is fixed to the light source attaching substrate 7 such that at least a part of the light source 1 is disposed at the inside of the through hole 112 (step S74).

Note that a base material for fixing a sensor head, a protective material, a wiring member, and the like can be appropriately attached thereto as needed.

By forming the encoder as described above, because the light source 1 can be attached to the new substrate 7 which is not the semiconductor substrate 5, the process for manufacturing the semiconductor substrate 5 is simplified, and a process of providing an electrode at the inside of the concave portion, a process of carrying out wiring, and further, a process of controlling the depth of the concave portion are made unnecessary. Therefore, a semiconductor substrate can be more easily formed.

Note that, in the present embodiment, various slits, such as a slit in which patterning is applied onto a transparent substrate such as a glass plate or a PED film with a metallic film or the like, a slit in which penetration etching is applied to a metallic plate, or the like, may be utilized. Further, when a slit in which patterning is applied onto a glass plate is used, the slit pattern surface is preferably made to be at the light source side such that the photodetector and the slit are made to be the same plane.

Figure 23:
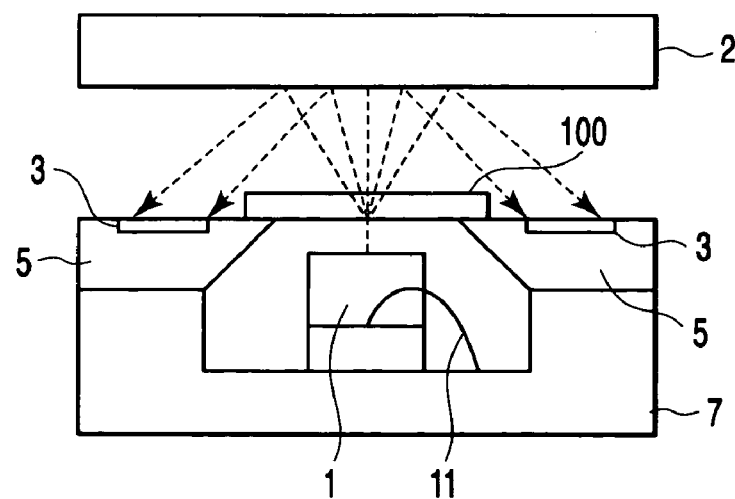
FIG. 23 a diagram showing a modified example of the third embodiment of the invention.

Note that, when the light source 1 is larger than the thickness of the semiconductor substrate 5, as shown in FIG. 23, a concave portion is provided at the substrate 7 as well, and due to the light source 1 being disposed at this portion, it is possible to realize a configuration which is the same as the present embodiment. Further, when the light source 1 is smaller, and there is a wish to dispose it in the vicinity of the slit 100, in contrast, it is recommended that the substrate 7 is configured such that the portion at which-the light source 1 is disposed is made to be a convex portion with respect to the portion contacting the semiconductor substrate 5 be used.

By configuring the encoder as described above, an optical encoder which is more easily assembled and manufactured and a method of manufacturing the same can be provided while the first embodiment being utilized as is.

(Fourth Embodiment)

Next, a fourth embodiment of the present invention will be described with reference to FIGS. 9 to 11, and 31. In the present embodiment, the respective members are configured in the same manner as in the third embodiment of the invention shown in FIG. 7, and the basic operation is the same as that of the first embodiment.

In the fourth embodiment shown in FIG. 9, in the same way as the third embodiment, the semiconductor substrate 5 has the through hole 112, and the light source 1 and the semiconductor substrate 5 are fixed to the common substrate 7. In the fourth embodiment, the operation as an encoder is not different at all from that of the third embodiment. However, the fourth embodiment differs from the third embodiment in that the slit 100 is formed so as to be integrated with the semiconductor substrate 5 by using the semiconductor manufacturing technique.

By configuring the optical encoder in this way, because there is no need to separately manufacture and attach the slit 100, the number of parts can be reduced, and the optical encoder can be made in a lower price. Further, because it is possible to adjust the position of the slit 100, the position of the photodetector 3, and a deviation in direction at a semiconductor manufacturing technical level, a more precise encoder can be configured.

Next, a method of manufacturing an encoder according to the fourth embodiment will be described hereinafter. First, the photodetector 3 is manufactured by a general technique, and a driving circuit for the light source 1, a signal processing circuit, and the like are manufactured as needed, on the semiconductor substrate 5. In the processes or after the processes, a pattern portion of the slit 100 is formed on the surface, on which the slit 100 is formed, of the surface on which the photodetector 3 of the semiconductor substrate 5 is formed. A metallic member or the like for forming the wiring electrode on the semiconductor substrate 5 can be used for this slit pattern. Next, the through hole 112 is formed on the semiconductor substrate 5 from the surface side contacting the substrate 7 of the semiconductor substrate 5. The through hole 112 can be formed by dry etching, wet etching, and the like, which are general semiconductor manufacturing techniques. Then, there are an etching stopper layer and the like in the vicinity of the slit pattern, and when the slit opening is not made to be a through hole, this portion is opened.

This process is possible due to, generally, dry etching, wet etching, or the like, although depending on a material of the etching stopper layer or the like. At this time, when the slit opening is made to be a through hole, the etching stopper layer may be left at the slit pattern portion, and may be removed. Accordingly, the process of removing the etching stopper layer can be carried out from only one side of the semiconductor substrate, or can be carried out from the both sides.

Figure 31:
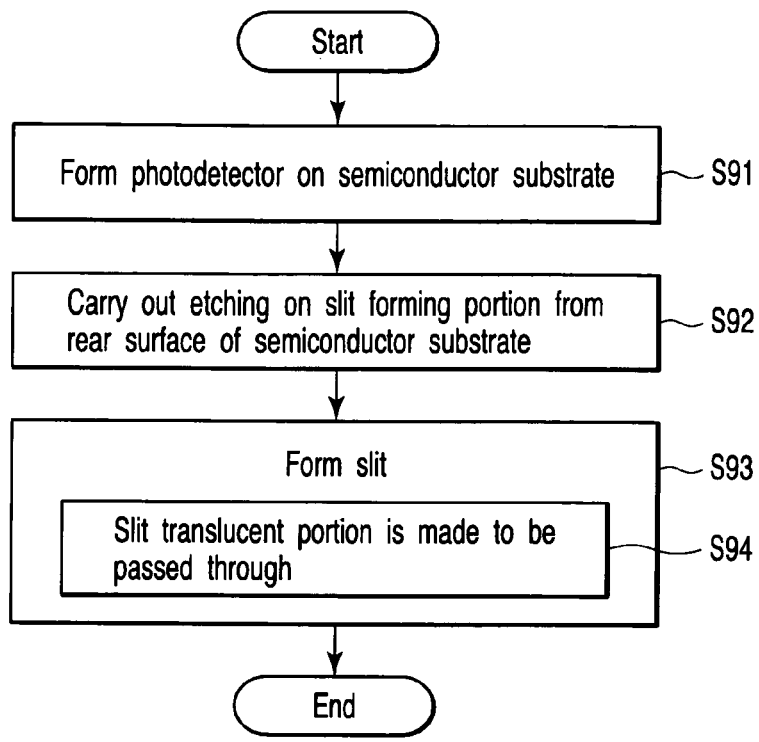
FIG. 31 is a flowchart for explaining operation of the fourth embodiment of the invention.

The method of manufacturing an encoder head according to the present embodiment described above can be summarized as in the flowchart of FIG. 31. First, the photodetector 3 is formed at the semiconductor substrate 5 (step S91). Next, etching is applied to the portion on which a slit is formed from the rear surface of the semiconductor substrate (step S92). Next, the slit 100 is formed (step S93). At this time, a constitution body needed for forming the slit 100, for example, a metal pattern or the like having an opening at the slit 100 may be formed on the semiconductor substrate 5 at a step prior to the step S92. Note that step S93 has a step of penetrating a slit opening portion (step S94).

Next, the light source 1 is disposed to a predetermined position of the substrate 7 on which a wiring pattern which can be electrically connected to the upper and lower electrodes of the light source 1, such that the lower electrode of the light source 1 and a lower electrode connecting pad are connected directly or via an adhesive layer, and further, the wiring electrode 11 is connected to the upper electrode. Next, the semiconductor substrate 5 is fixed to the substrate 7 such that the light source 1 is disposed at the inside of the through hole 112 formed on the semiconductor substrate 5. Here, an electrode is provided at a portion of the substrate 7 contacting the semiconductor substrate 5, and a reference voltage of the semiconductor substrate 5 can be obtained. Note that the electric wiring with respect to the light source 1 is applied to the substrate 7. However, in addition thereto, electric wiring with respect to the semiconductor substrate 5 can be provided. In a case of providing such wiring, after the semiconductor substrate 5 and the substrate 7 are connected, the semiconductor substrate 5 and the semiconductor substrate 7 are electrically connected to each other.

Further, a base material for fixing a sensor head 30, a protective material, a wiring member, and the like can be appropriately attached thereto as needed.

Note that, in the present embodiment, a pattern of the slit 100 is supposed be a metallic member for a wiring electrode or the like used for the semiconductor manufacturing process. However, in addition thereto as shown in FIGS. 10 and 11, the pattern of the slit 100 can be formed from the semiconductor substrate itself.

Figure 10:
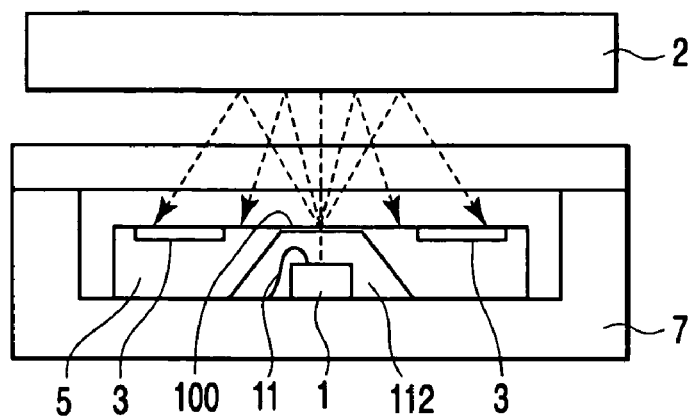
FIG. 10 is a diagram showing a modified example of the fourth embodiment of the invention.
Figure 11:
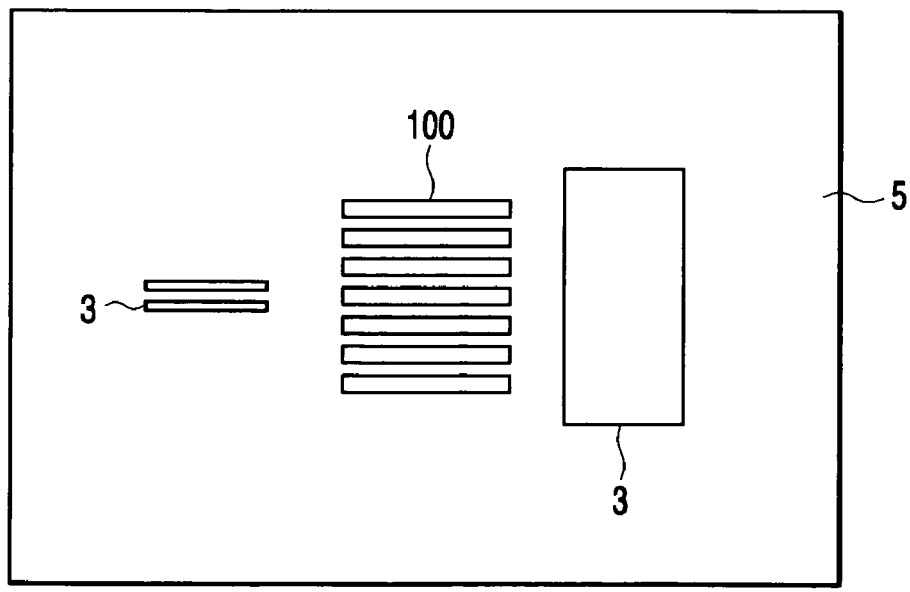
FIG. 11 is a diagram showing a modified example of the fourth embodiment of the invention.

FIG. 10 is a sectional view for explaining a modified example of the fourth embodiment of the invention. The basic configuration thereof is the same as that of the fourth embodiment shown in FIG. 9. However, the modified example differs therefrom in that the slit 100 is formed from the semiconductor substrate 7 itself. FIG. 11 shows a top view of the semiconductor substrate 5 configuring FIG. 10. As shown in FIG. 11, the opening 102 itself of the slit 100 is a through hole of the semiconductor substrate 5, and a shielding portion of the slit 100 is the semiconductor substrate 5. By configuring in this way, there is no need to newly provide a member for a slit, and further, a slit can be formed in the etching process of the semiconductor substrate 5.

By configuring the encoder head as in the above-described fourth embodiment and the modified example thereof, in addition to the third embodiment, there is no need to separately manufacture and attach the slit 100, and further, because it is possible to adjust the positions between the respective members and the slit, in particular, to adjust the attaching positions and the angles of the photodetector and the slit at a semiconductor manufacturing technical level, it is possible to achieve both of a low price and a high performance.

Accordingly, the features of the first and third embodiments can be kept as they are, and an optical encoder which is more easily assembled and manufactured and is highly precise, and a method of manufacturing the same can be provided.

(Fifth Embodiment)

Next, a fifth embodiment of the present invention will be described with reference to FIGS. 12 to 14.

In the present embodiment, the respective members are configured in the same manner as in the fourth embodiment of the invention shown in FIG. 9, and the basic operation is the same as that of the first embodiment.

Figure 12:
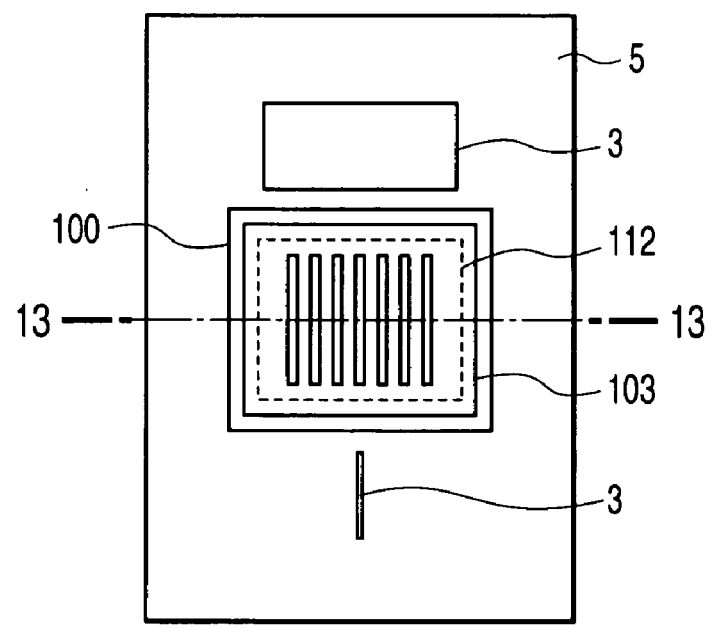
FIG. 12 is a top view of a semiconductor substrate 5 for use in fifth and sixth embodiments of the present invention.
Figure 13:
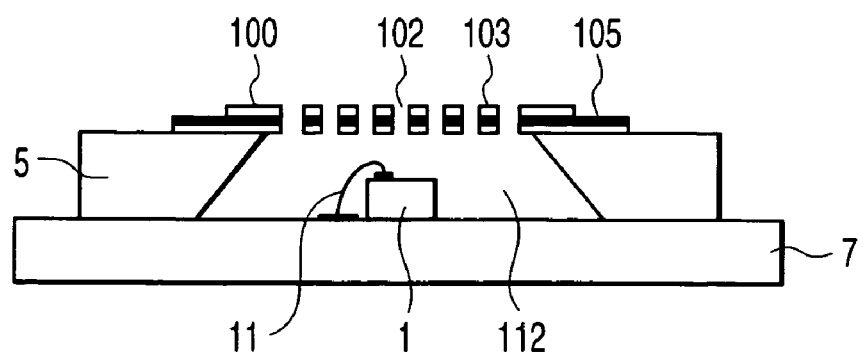
FIG. 13 is a diagram showing a cross-section taken along line B–B' of FIG. 12.

In the fifth embodiment shown in FIGS. 12 and 13, the semiconductor substrate 5 has the through hole 112, and the light source 1 and the semiconductor substrate 5 are fixed to the common substrate 7 in the same way as the fourth embodiment. Further, the slit 100 is formed so as to be integrated with the semiconductor substrate 5 by using a semiconductor manufacturing technique. In the fifth embodiment, the operation as an encoder is not different at all as compared with the fourth embodiment. However, the fifth embodiment differs from the fourth embodiment in that a reinforcing member 103 is provided at the shielding portion of the slit 100.

FIG. 12 is a top view of the semiconductor substrate 5 used for the fifth embodiment, and FIG. 13 shows a B–B' cross-section of the drawing. As shown in FIG. 12, the slit 100 is disposed on the through hole 112 formed on the semiconductor substrate 5, between the two photodetectors 3. Then, the reinforcing member 103 is formed so as to sandwich the metallic member on which a slit pattern is formed.

FIG. 13 is a B–B' cross-section of FIG. 12. The reinforcing member 103 is disposed so as to sandwich a slit pattern 105. At this time, it is configured such that there is no reinforcing member at a portion where the slit pattern 105 does not exist, i.e., at the opening 102 of the slit. The reason for this is that the light beam passing through the slit 100 is affected if there is the reinforcing member 103 at the opening 102 of the slit.

Further, such a reinforcing member 103 can be formed at the both surfaces of the slit pattern 105 as shown in FIG. 13, or can be formed at one of both surfaces.

In the present embodiment, this reinforcing member 103 is supposed to be a silicon oxide film which can be easily formed by a semiconductor manufacturing technique. However, a silicon oxide film may be used in the same way, or a polyimide film or the like can be used.

By configuring the optical encoder in this way, the slit 100 can be prevented from being deformed or broken down in the manufacturing process or during the time of using a sensor.

Figure 14:
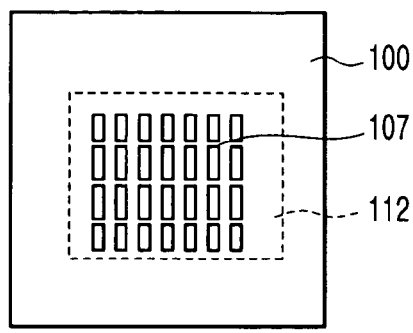
FIG. 14 is a diagram showing a modified example of the fifth embodiment of the invention.

Note that, due to a beam 107 being provided in the cross direction to the slit 100 as shown in FIG. 14, the slit 100 can be made even stronger.

In accordance with the present embodiment, the feature of the fourth embodiment can be kept as it is, and an even stronger slit can be provided.

(Sixth Embodiment)

Next, a sixth embodiment of the present invention will be described with reference to FIGS. 12 and 13.

In the present embodiment, the respective members are basically configured in the same manner as in the fifth embodiment of the invention shown in FIGS. 12 and 13, and the basic operation is the same as that of the first embodiment.

In the sixth embodiment of the present invention, a reduction of the light beam emitted from the light source 1 and a reduction of reflection with respect to the light beam reflected by the scale 2 are aimed for.

In the present embodiment, the slit pattern 105 is formed from a metallic member, and in a state in which any of processings or the like is not applied to the surface of the light source 1 side of the slit pattern 105, the light beam emitted from the light source 1 is reflected. When the reflected light is incident upon the light source 1, there is the concern that a beam intensity of the light beam emitted from the light source 1 changes, and when the reflected light from the scale 2 is reflected by the slit pattern 105, and is incident upon the photodetector 3 via the scale 2 or the like, there is a possibility in which the detected signal is affected by a noise, an error signal, or the like, which is not necessarily a preferable configuration.

Accordingly, the reinforcing member 103 provided above and below the slit pattern 105 is configured so as to reduce the reflection of the light beam emitted from the light source 1. In the present embodiment, the reinforcing member 103 is formed from a silicon oxide film, and the optical thickness is, given that the wavelength of the optical beam emitted from the light source 1 is $\lambda$, configured so as to satisfy $$(\frac{1}{4}+n/2)\lambda: n \text{ is an integer.}$$

By configuring the optical encoder in this way, a reflection factor of the light beam of a wavelength $\lambda$ which has been incident upon the slit pattern 105 of the slit 100 can be reduced. When a thickness of the reinforcing member 103 is actually determined, it must be calculated in consideration of the refraction factor of a silicon oxide film to be used.

Note that, in the present embodiment, it is configured such that the reinforcing member 103 is a transparent silicon oxide film, and is made to have a film thickness so as to reduce the reflection factor. However, the reinforcing member 103 may be configured in the same way by using another transparent film, and if it is a member in which the reflection factor of the light beam emitted from the light source 1 can be reduced, for example, even when a black member or a member scattering the light beam by providing convex/concave onto the surface thereof is used, the same effects of the present embodiment can be obtained.

Further, in the present embodiment, it is configured such that the reflection factor is reduced by using the reinforcing member 103. However, it is not necessarily the reinforcing member 103, and a member reducing a reflection factor may be provided on the reinforcing member 103, and further, in a case of a configuration in which there is no need to use the reinforcing member 103, a reflection reducing member may be directly provided to the slit pattern 105.

Moreover, in the present embodiment, the reinforcing member 103 is provided above and under the slit pattern 105. However, even if reflection is reduced by the reinforcing member 103 at one side of the light source 1 side and the scale 2 side of the slits 100, the effect can be sufficiently accepted.

(Seventh Embodiment)

Figure 15:
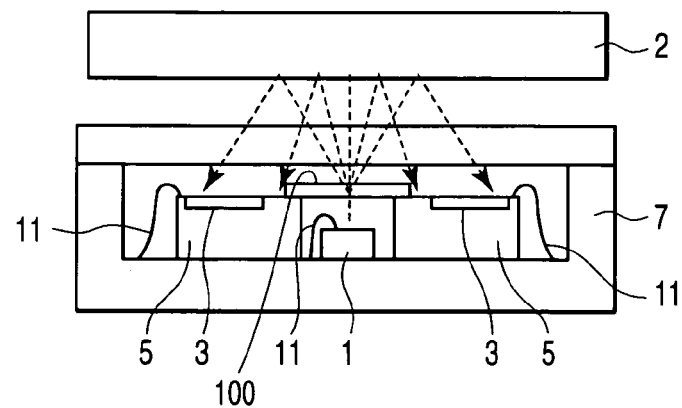
FIG. 15 is a diagram (sectional view) showing a configuration of an optical encoder according to a seventh embodiment of the present invention.
Figure 16:
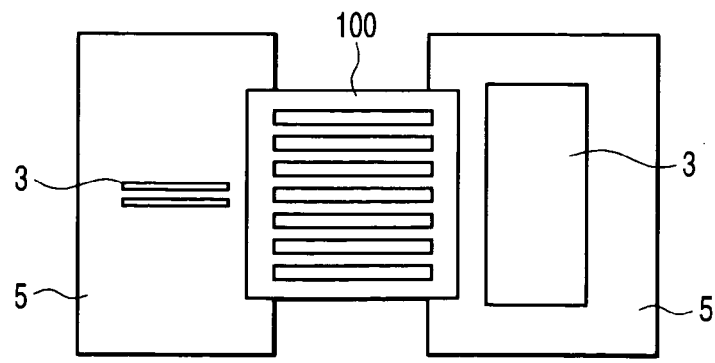
FIG. 16 is a diagram (top view) showing a configuration of an optical encoder according to the seventh embodiment of the present invention.

Next, a seventh embodiment of the present invention will be described with reference to FIGS. 15, 16, and 32.

In the present embodiment, it is configured that the basic operation is the same as that of the first embodiment. In the first embodiment of the invention, it is configured such that the concave portion 110 is provided on one semiconductor substrate, the light source 1 is provided in the concave portion 110, and further, the slit 100 is provided on the concave portion 110. The seventh embodiment of the present invention shown in FIG. 15 differs from the first embodiment in that the plurality of semiconductor substrates 5 are provided on the substrate 7, the light source 1 is disposed in the vicinity of the plurality of semiconductor substrates 5, and the slit 100 is disposed so as to extend over the plurality of semiconductor substrates 5.

Namely, in the seventh embodiment of the invention, two of the semiconductor substrates 5 having the photodetectors 3 are disposed on the substrate 7. These two semiconductor substrates 5 are formed so as to have a substantially same height. The light source 1 is disposed between the two semiconductor substrates 5 and on the substrate 7, and the slit 100 is disposed on the light source 1 so as to extend over the two semiconductor substrates 5 as shown in FIGS. 15 and 16. The electric wiring 11 electrically connected to the light source 1 and the semiconductor substrate 5 is formed at the substrate 7, and is configured so as to be respectively connected thereto appropriately. The arranging direction of the slit 100 arranged in a space on the light source 1 is determined in accordance with a signal to be detected and an arranging direction of the photodetectors 3.

Next, a method of assembly and manufacturing in the present embodiment is shown hereinafter. First, the two semiconductor substrates 5 having the photodetectors 3, and the light source 1 are fixed on the substrate 7 so as to be in a predetermined positional relationship. Next, the electric wiring 11 is connected to the light source 1 and the semiconductor substrates 5. Thereafter, assembly is carried out by disposing the slits 100 so as to extend over the two semiconductor substrates 5 in a space above the light source 1.

Figure 32:
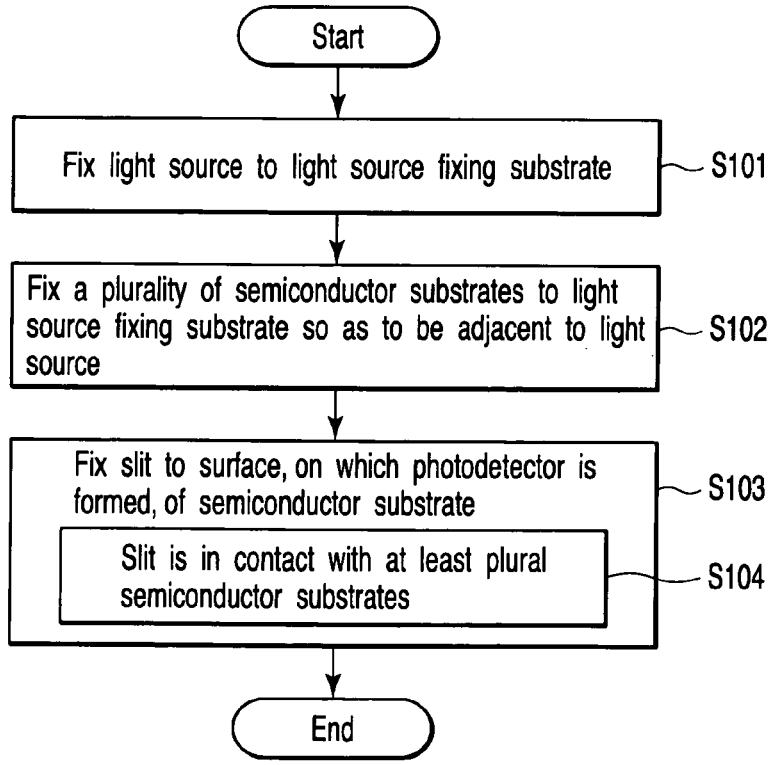
FIG. 32 is a flowchart for explaining operation of the seventh embodiment of the invention.
Figure 33:
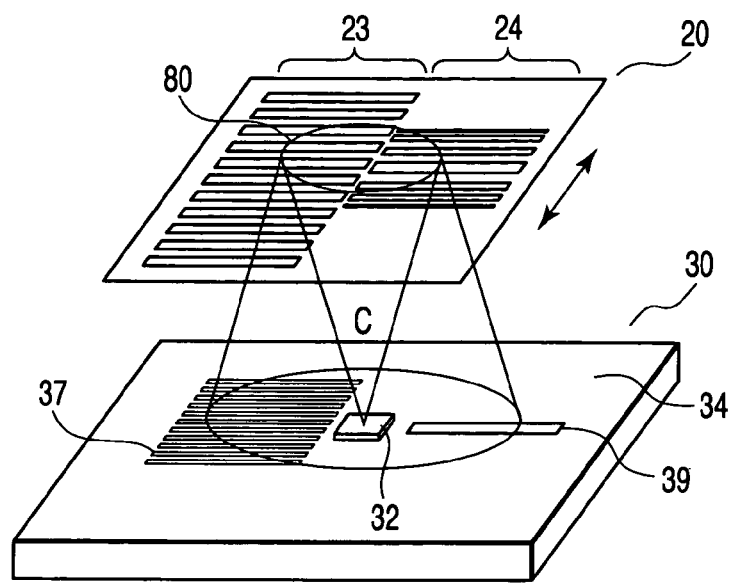
FIG. 33 is a diagram for explaining a typical optical encoder as a first prior art.
Figure 34:
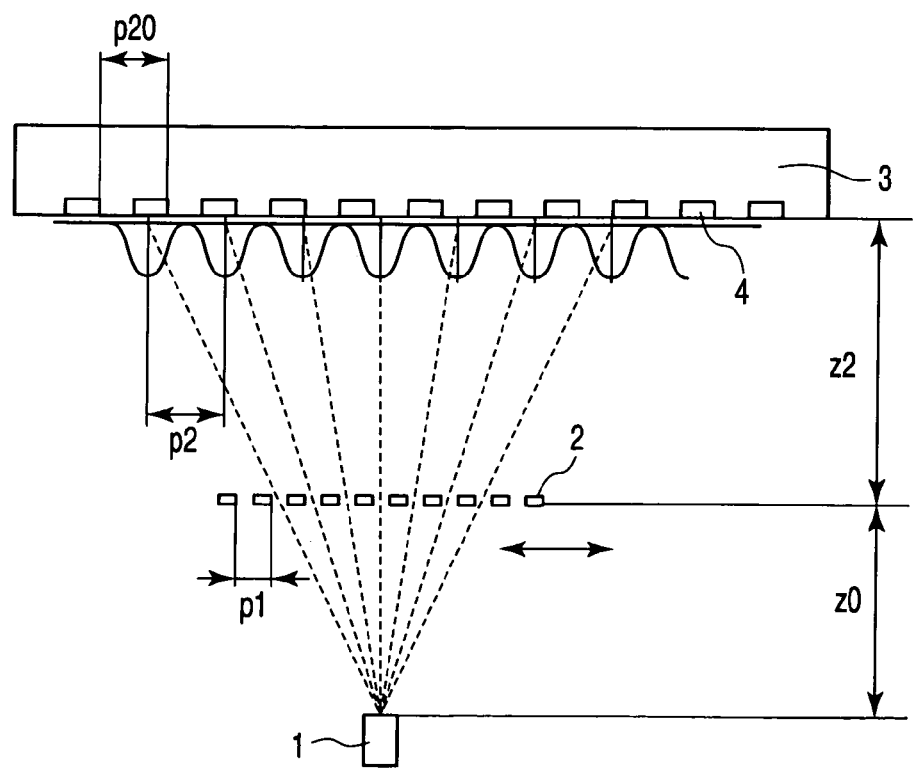
FIG. 34 is a diagram used for explaining definition of respective constituting parameters.

The method of manufacturing an encoder head according to the present embodiment described above can be summarized as in the flowchart of FIG. 32. First, the light source 1 is fixed to the light source fixing substrate (step S101). Next, the plurality of semiconductor substrates 5 having the photodetectors 3 are fixed in the vicinity of the light source 1 (step S102). Next, the slit 100 is fixed to the surface on which the semiconductor substrates 5 have been formed (step S103). At this time, the slit 100 may be fixed on a light receiving area of the photodetector 3, or may be fixed on only the area other than it. In step S103, the slit 100 is configured so as to contact at least plural semiconductor substrates 5 (step S104).

Note that, in the above-described assembly process, the order of assembly can be appropriately switched in accordance with the configuration.

By configuring the optical encoder in this way, the semiconductor substrate 5 on which the photodetector 3 is mounted can be made compact, and the process of providing the concave portion 110 or the through hole 112 at the semiconductor substrate 5 can be omitted. Further, the appropriate photodetectors 3 can be selected and combined in accordance with a signal to be detected or a scale pattern.

Note that, in the present embodiment, the two semiconductor substrates 5 are used. However, three or more semiconductor substrates may be used, or when at least one of the plurality of semiconductor substrates has the photodetector 3, the semiconductor substrates other than the one may be integrated with only the signal processing circuits, or may be a semiconductor substrate which is for simply holding the slit 100 and which does not especially have a function. Further, the slit 100 may be maintained by at least two of the semiconductor substrates 5, and may be attached so as to extend over the three or more semiconductor substrates.

Further, in the present embodiment, when the plurality of semiconductor substrates 5 have the photodetectors 3, the respective photodetectors 3 may be configured so as to detect the same light signal, and may be configured so as to receive individual light signals. Moreover, it can be configured such that at least one of the photodetectors 3 is the photodetector 3 detecting a Talbot image, and at least another photodetector has the photodetector 3 for detecting a reference position.

(Eighth Embodiment)

Next, an eighth embodiment of the present invention will be described with reference to FIGS. 17 and 18. In the present embodiment, it is configured that the basic operation is in the same as the first embodiment.

Figure 17:
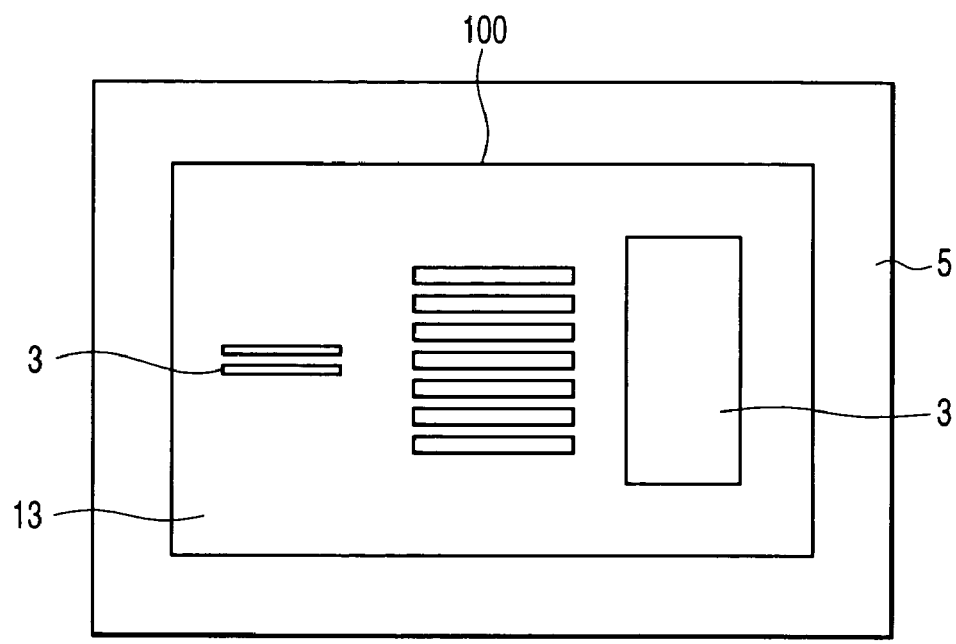
FIG. 17 is a top view showing a configuration of an optical encoder according to an eighth embodiment of the present invention.
Figure 18:
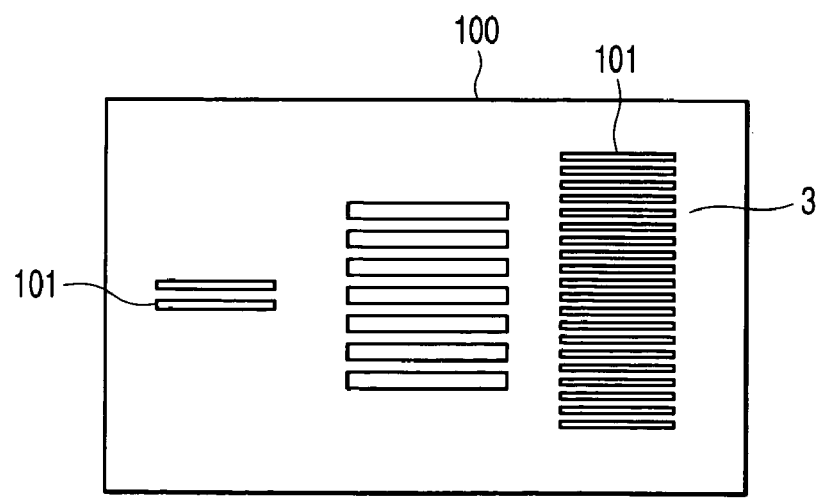
FIG. 18 is a diagram showing a modified example of the eighth embodiment of the invention.

FIG. 17 is a diagram showing a top view of a semiconductor substrate at which the slit 100 is provided and which is used for the eighth embodiment. The slit 100 is disposed at the portion including a region where the slit must be disposed and the peripheral portion of the photodetector 3, of the semiconductor substrate 5, and the upper portion of the light receiving portion of the photodetector 3 is made to be an opening. Moreover, the peripheral portion of the light receiving portion of the photodetector 3 is shielded by a shielding region 13 of the slit 100, and the light source 1 is disposed under the region at which the slit opening of the slit 100 is formed.

By configuring the optical encoder in this way, because the slit 100 can shield the light beam incident upon the circumference of the photodetector 3, the light incident upon the circumference of the photodetector 3 can be prevented from affecting the operation of IC elements disposed at the circumference, and a signal noise which is detected by the photodetector 3 through the semiconductor substrate 5 can be reduced.

Note that, in the present embodiment, the slit 100 is supposed be a type in which an opening is provided on the metallic plate by etching or the like. However, a type in which a slit is configured on a transparent substrate such as a glass or the like by patterning may be used. Further, as shown in FIG. 18, it may be a configuration such that the slit 100 has an index slit 101 formed on the photodetector 3.

Further, the semiconductor substrate 5 having the photodetector 3 used for the present embodiment may be a semiconductor substrate having the concave portion 110 as shown in the first and second embodiments, or may be a semiconductor substrate having the through hole 112 as shown in the third embodiment. Moreover, it may be a semiconductor substrate at which the slit 100 is provided so as to extend over a plurality of semiconductor substrates as shown in the seventh embodiment of the present invention.

Note that, if the region to which electric wiring provided on the semiconductor substrate 5 is connected is excepted therefrom, the slit 100 may cover the substantially entire region of the semiconductor substrate 5.

(Ninth Embodiment)

Figure 20:
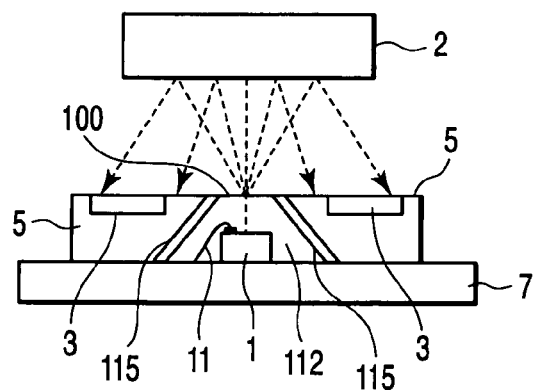
FIG. 20 is a diagram showing a modified example of the ninth embodiment of the invention.
Figure 21:
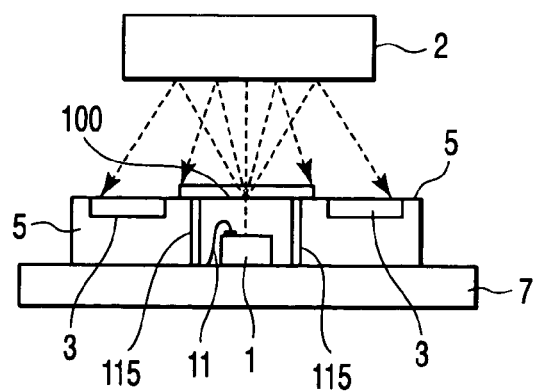
FIG. 21 is a diagram showing a modified example of the ninth embodiment of the invention.

Next, a ninth embodiment of the present invention will be described with reference to FIGS. 19 to 21. In the present embodiment, it is configured that the basic operation is in the same as the first embodiment.

Figure 19:
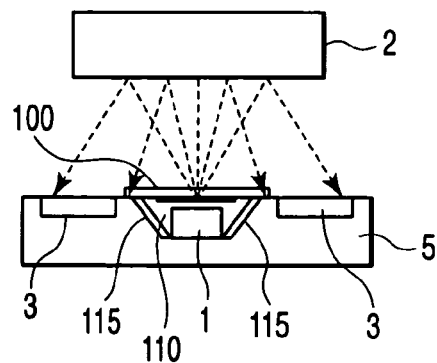
FIG. 19 is a diagram showing a configuration of an optical encoder according to a ninth embodiment of the present invention.

FIG. 19 is a diagram showing a configuration of an optical encoder according to the ninth embodiment of the present invention. The basic configuration is the same as that of the first embodiment, and the ninth embodiment differs from the first embodiment in that a shielding member 115 is provided at the wall surface of the concave portion 110 which the semiconductor substrate 5 has. This shielding member 115 may be any of members shielding the light beam emitted from the light source 1, and is formed from a metallic thin film such as aluminum in the present embodiment. By configuring the optical encoder in this way, components proceeding toward the wall surface of the concave portion 110 provided at the semiconductor substrate 5, from among the light beam emitted from the light source 1, are shielded by the shielding member 115, and are not made to penetrate into the semiconductor substrate 5.

When there is no shielding member 115, the light irradiated onto the wall surface of the concave portion 110 is absorbed into the semiconductor substrate 5, and an electron-hole pair is formed at the inside of the semiconductor substrate 5. When the electron-hole pair moves inside the semiconductor substrate 5 and reaches the photodetector 3, the electron-hole pair is detected by the photodetector 3. At the same time, because the light beam modulated by the scale 2 is detected as a signal light by the photodetector 3, the photodetector 3 cannot distinguish a noise component from a component of the signal light. Then, by configuring the optical encoder as in the ninth embodiment of the present invention, such a detection error or a noise component can be reduced.

Note that, in the present embodiment, the shielding member 115 is formed at the encoder head which is a type having the concave portion 110 as shown in FIG. 19. However, a configuration in which the shielding member 115 is formed at the encoder head which is a type having the through hole 112 as shown in FIG. 20, or a configuration in which the shielding member 115 is formed at the encoder head which is a type having the plurality of semiconductor substrates 5 as shown in FIG. 21 are possible.

Further, when the shielding member 115 is formed from a metallic film or the like, there is a possibility in which an optical output of the light source 1 is made unstable due to the reflected light returning to the light source 1, or the like. Therefore, as the shielding member 115, a member which reduces the reflection factor with respect to the light beam emitted from the light source 1 or a member onto which such a treatment has been applied is preferably used.

(Tenth Embodiment)

Figure 25:
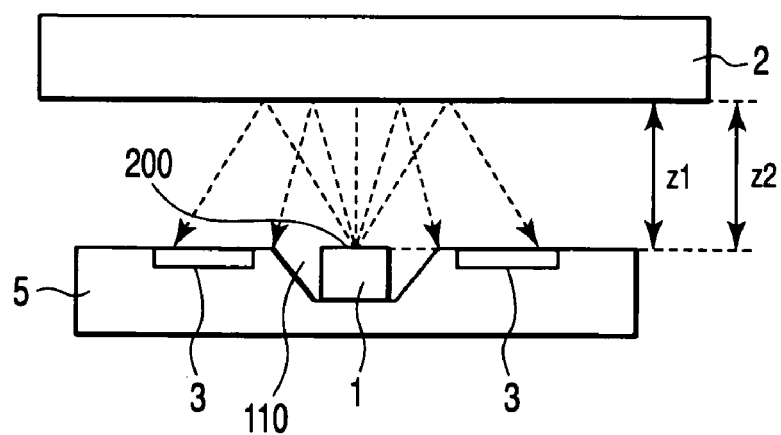
FIG. 25 is a diagram for explaining a tenth embodiment of the present invention.

Next, a tenth embodiment of the present invention will be described with reference to FIGS. 25 to 27. The tenth embodiment is an embodiment in which the height of a light beam emitting portion and the height of a photodetector are formed so as to be the same when a point light source is used. As shown in FIG. 25, in the optical encoder of the present embodiment, the concave portion 110 is provided at the semiconductor substrate 5 having the photodetector 3, and the light source (here a point light source) 1 is disposed at the inside of the concave portion 110. Here, the height of a light beam emitting window 200 serving as a light beam emitting portion of the light source 1 and the height of the photodetector 3 are disposed so as to be equal to each other. In this case, because a point light source is used as the light source 1, the slit used in the first to ninth embodiments is unnecessary.

The operation of the optical encoder having such a configuration is basically the same as in the first embodiment except for the point that the light beam emitted from the light beam emitting window 200 of the light source 1 is directly irradiated onto the scale 2.

Figure 26:
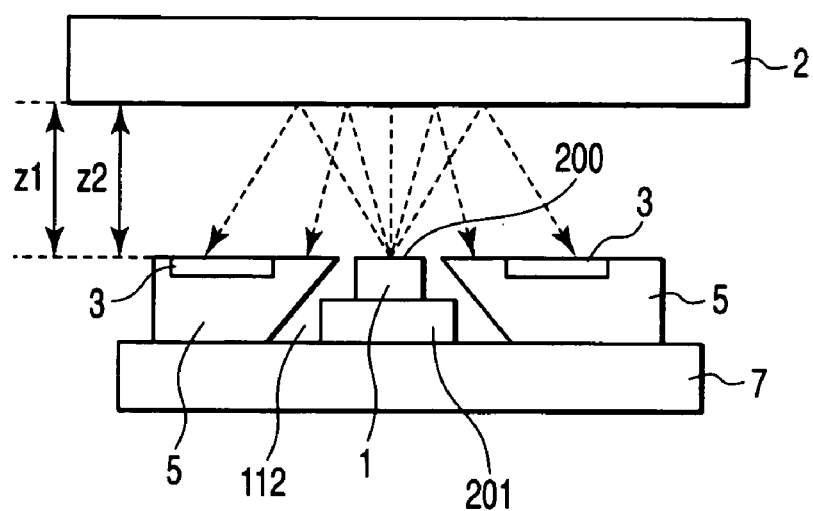
FIG. 26 is a diagram for explaining a modified example of the tenth embodiment of the invention.

FIG. 26 is a configuration in which the through hole 112 is provided at the semiconductor substrate 5 and the light source 1 is disposed at the inside of the through hole 112. The light source 1 and the semiconductor substrate 5 are fixed to the common substrate 7. Here, there is the feature that a light source height adjusting stand 201 is disposed in order for the height of the light beam emitting window 200 serving as a light beam emitting portion of the light source 1 and the height of the photodetector 3 to be made to coincide with one another.

Figure 27:
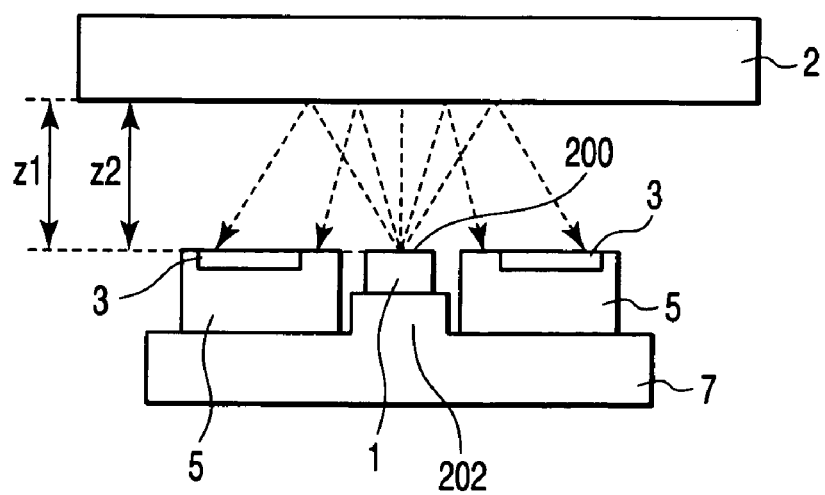
FIG. 27 is a diagram for explaining a modified example of the tenth embodiment of the invention.

FIG. 27 is a diagram showing a modified example of the embodiment described in FIG. 26, and here, there is the feature that a light source height adjusting protruding portion 202 is provided at the common substrate 7 in order for the height of the light beam emitting window 200 serving as a light beam emitting portion of the light source 1 and the height of the photodetector 3 to be made to coincide with one another.

The operation of the configurations of FIG. 27 is basically the same as the operation of the configuration of FIG. 26.

In accordance with the present embodiment, because the height of the light beam emitting portion of the light source 1 and the height of the photodetector 3 are the same, a gap between the sensor head and the scale 2 can be kept constant, and the sensor can be made compact in accordance therewith.

(Eleventh Embodiment)

Next, an eleventh embodiment of the present invention will be described with reference to FIG. 24.

Figure 24:
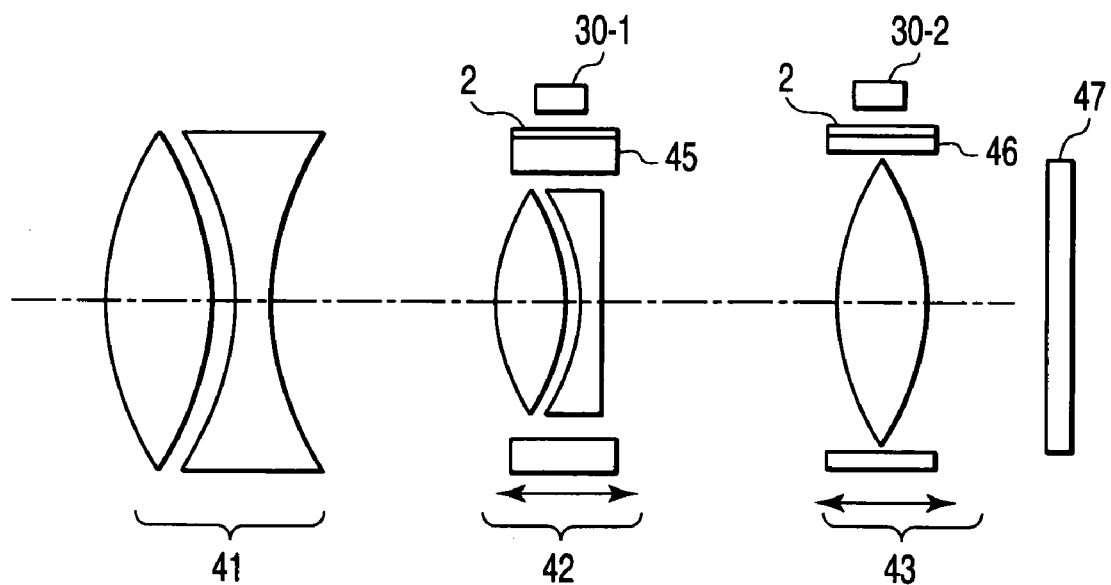
FIG. 24 is a diagram for explaining an eleventh embodiment of the present invention.

FIG. 24 shows a configuration of a lens module for carrying out detection of a position of a lens by using the optical encoder shown in the above-described first to tenth embodiments of the present invention. FIG. 24 shows a zoom lens module having three lens groups. Reference numerals 41, 42, and 43 in the drawing respectively denote first, second, and third lens groups, and it is configured such that, the first, second, and third lens groups 41, 42, and 43 are relatively moved, and thereby a zooming magnification of the lens module and so-called focusing on a screen 47 are adjusted.

In the present embodiment, the first lens group 41 is fixed to a housing (not shown), and the second lens group 42 and the third lens group 43 are fixed to housings 45 and 46 movable in the directions with respect to the housing. This lens module is configured such that a zooming magnification can be adjusted by moving the second lens group 42 in the drawing and focusing on the screen 47 surface can be adjusted by moving the third lens group 43. An image pick-up element such as a CCD, or a camera film corresponds to the screen 47.

Next, one example of operation of the lens module will be described.

When an attempt is made to adjust focusing on the screen 47, the adjustment is carried out by moving the third lens group 43 with respect to the housing. First, a distance from the screen 47 to an object is measured. As a method for measuring this distance, general various methods for measuring a distance can be used. In the lens module, because a position, in accordance with the measured distance, of the third lens group 43 which is for focusing on the screen 47 is set in advance, the third lens group 43 is moved by an actuator (not shown) or the like so as to show a desired position due to an output of an optical encoder 30-2. In this way, the lens module can be set so as to be in the positional relationship of the lenses whereby an image is in focus on the screen 47.

At this time, even when the photographing distances are the same, the position of the third lens group 43 for being in focus differs in accordance with a zooming magnification, in other words, in accordance with a position of the second lens group 42 for setting a zooming magnification. Accordingly, the position of the third lens group 43 for being in focus is a function of, not only the photographing distances, but also the second lens group 42. Therefore, it is necessary to exactly know the position of the second lens group 42.

In the present embodiment, a movement of the second lens group 42 can be obtained by an output of the optical encoder 30-1. Accordingly, the position of the third lens group 43 for being in focus is calculated on the basis of the photographing distance obtained by a general method for measuring a distance and an output of the optical encoder 30-1 showing the position of the second lens group 42. Then, by adjusting the position of the third lens group 43 while monitoring the output of the optical encoder 30-2 so as to be at a desired position, it is possible to focus by a desired lens magnification and at a desired photographing distance.

The lens module in the present embodiment is described on the assumption of the zoom lens module using three lens groups. However, the lens module can be applied to a lens module using four or more lens groups, or a lens module using two lens groups. Further, the lens module in the present embodiment is on the assumption of a zoom lens module. However the lens module can be applied to a fixed focusing lens as well.

Moreover, in the present embodiment, the two optical encoders are used in order to detect the positions of the two lens groups. However, it may be one optical encoder for detecting a position of one lens group, or three or more optical encoders for detecting the positions of three or more lens groups may be mounted therein. Further, the encoders may be mounted along with another displacement sensor as needed.

As for the precision of measurement required for measuring the positions of the respective lens groups in the lens module as described above, because even highly precise detection of a position is required in accordance with miniaturization of a lens module, the lens module as described above is especially effective in miniaturization of a lens module.

Figure 37:
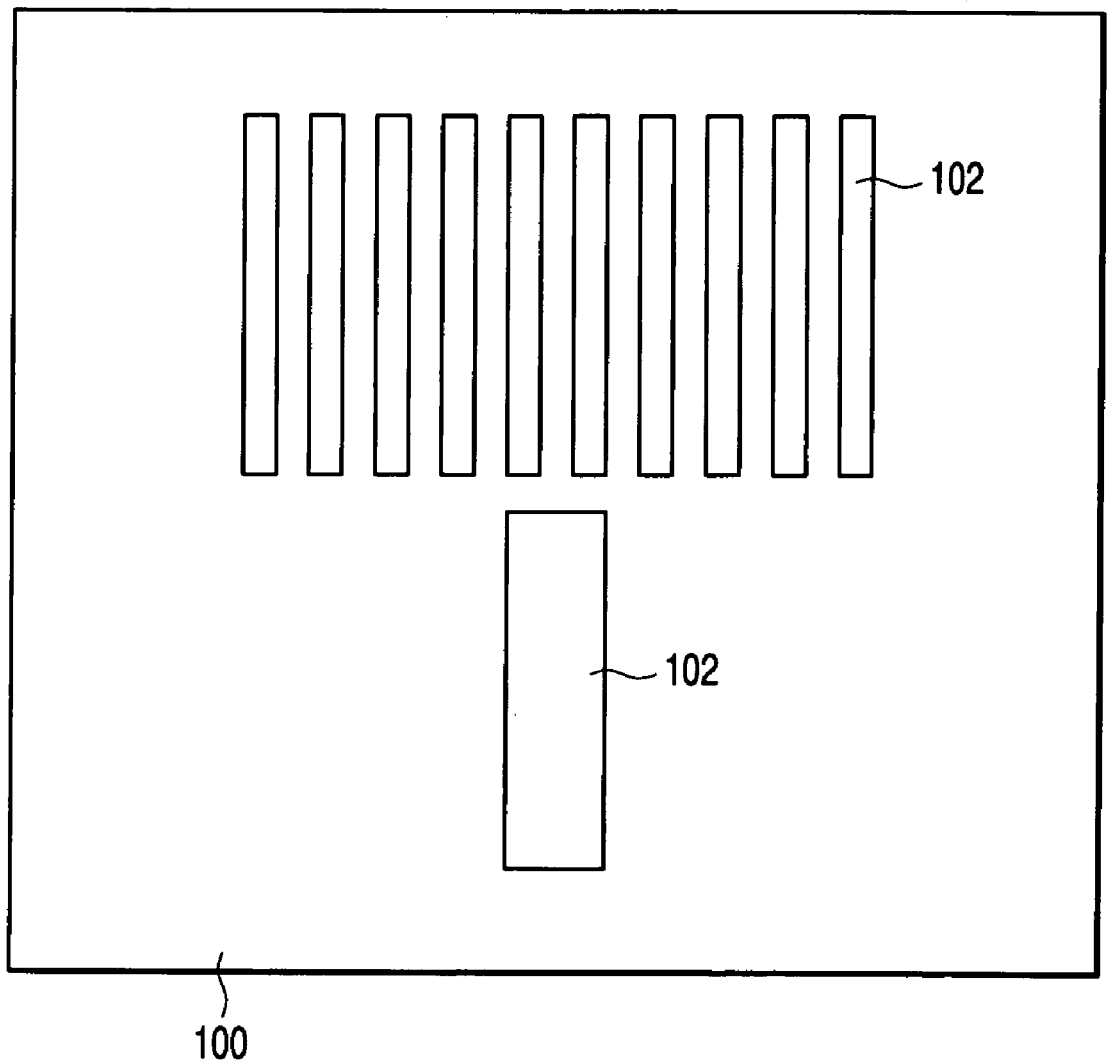
FIG. 37 is a modified example of the above-described embodiments of the present invention.

In all of the above-described embodiments of the present invention, a single slit has been explained referring to FIG. 2, and a plurality of slits arranged in a scale moving direction have been explained referring to FIG. 3. However, the present invention is not limited to the above-described slits in any way. For example, a construction in which a single slit and a plurality of slits are arranged in a direction perpendicular to a scale moving direction, example of which is shown in FIG. 37, can be used.

In all of the above-described embodiments of the present invention, as a scale, the reflective type scale in which a reflection intensity periodically changes has been described. However, the present invention is not limited to this scale, provided that the scale is a so-called phase modulation type scale or a scale having an optical pattern, such as grating in which a reflecting surface has periodic convex and concave, which is configured such that the optical characteristic periodically varies, any scales can be used.

Further, in all of the above-described embodiments of the present invention which have been described above, by using a coherent light source, an encoder having an even higher performance by using a diffraction interference pattern typified by a Talbot image or the like can be formed.

In particular, when an LED is used as a coherent light source, it is possible to achieve both low price and high performance. Further, when an RC-LED or an SLD is used as a coherent light source, because those are more superior in coherency, the characteristic as an encoder can be especially improved. In addition to the above description, any coherent light source such as a surface emitting laser, a stripe type semiconductor laser, a current stricture type LED, or the like, is used, so that an encoder corresponding to the object can be provided.

In the present invention, various modifications and amendments are possible within a range which does not deviate from the gist of the present invention, and the embodiments described above are merely examples.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A reflective type optical encoder comprising:
a light source;
a scale which moves relatively with respect to the light source and which has a periodic optical pattern; and
a photodetector which can detect a change in an intensity pattern of a light beam that is emitted from the light source and is reflected and modulated by the scale,
wherein the photodetector is formed on a first surface of a semiconductor substrate and a concave portion is formed on the first surface of the semiconductor substrate where the photodetector is formed, the light source is disposed at a bottom of the concave portion on the semiconductor substrate, a slit, which is independent of the semiconductor substrate, is also disposed on the concave portion, and the light beam emitted from the light source irradiates the scale after passing through the slit.

2. An optical encoder according to claim 1, wherein the slit is disposed above the concave portion formed on the first surface of the semiconductor substrate so as to have an opening ranging from an external portion to the light source disposed in the concave portion, and a wiring for electric power supply to the light source is applied through the opening.

3. An optical encoder according to claim 2, wherein the opening is a notched portion formed at the slit.

4. An optical encoder according to claim 1, wherein a plurality of photodetectors are disposed so as to provide the slit therebetween on the semiconductor substrate substrate and the plurality of photodetectors are configured to detect a plurality of light signals from a plurality of scale tracks.

5. An optical encoder according to claim 4, wherein said plurality of scale tracks include a periodic track which is an optical pattern that periodically changes in a moving direction of the scale, and a reference position track which is a reference position pattern formed on the scale.

6. An optical encoder according to claims 1, wherein the slit is a slit in which an optical pattern is formed from a shielding member having a shielding effect for a wavelength of the light beam emitted from the light source, on a transparent member having a translucency for a wavelength of the light beam emitted from the light source.

7. An optical encoder according to claim 6, wherein the transparent member is a glass member.

8. An optical encoder according to claim 6, wherein the transparent member is polyethylene terephthalate or a resin material having a light permeability.

9. An optical encoder according to claim 6, wherein the surface of the optical pattern formed on the slit faces the light source.

10. An optical encoder according to claim 6, wherein the slit is attached such that the surface of the slit on which the optical pattern is formed is made to contact the surface of the semiconductor substrate on which the photodetectors are formed.

11. An optical encoder according to claims 1, wherein the slit is formed by molding a shielding member having a shielding effect for a wavelength of the light beam emitted from the light source in a slit form.

12. An optical encoder according to claim 11, wherein the shielding member is a metallic material.

13. An optical encoder according to claim 11, wherein the shielding member is a resin material.

14. An optical encoder according to claims 1, wherein a shielding member is disposed at a circumference of a light receiving portion of the photodetector, and the slit and the shielding member at the circumference of the light receiving portion are formed on a common member.

15. An optical encoder according to claims 1, wherein a shielding member is formed on at least a part of a region, onto which the light beam emitted from the light source is directly irradiated, of the semiconductor substrate on which the photodetector is formed.

16. An optical encoder according to claim 1, wherein a shielding member is formed on at least a part of a wall surface of the concave portion or the through hole formed on the semiconductor substrate.

17. An optical encoder according to claims 1, wherein given that a distance from the slit to the scale is z1, a distance from the scale to the light receiving surface of the photodetector is z2, a period of the optical pattern formed on the scale is p1, a wavelength of the light beam emitted from the light source is $\lambda$, and n is a natural number, the slit, the scale, and the photodetector are disposed so as to substantially satisfy a relationship of $1/z1+1/z2=\lambda/(n\times(p1)^2)$.

18. An optical encoder according to claims 1, wherein the photodetector is configured to be able to detect a predetermined phase portion of a bright/dark pattern in which the light beam emitted from the light source is modulated by the scale, and is projected onto the photodetector.

19. An optical encoder according to claims 1, wherein given that a distance from the slit to the scale is z1, and a distance from the scale to the light receiving surface of the photodetector is z2, a pitch of the opening of the slit opens at a position which is approximately $((z1+z2)/z2)$ times the scale pitch.

20. An optical encoder according to claims 1, wherein given that a distance from the slit to the scale is z1, and a distance from the scale to the light receiving surface of the photodetector is z2, the photodetector can detect a predetermined phase portion of an optical intensity pattern having a period which is approximately $((z1+z2)/z1)$ times the scale pitch.

21. An optical encoder according to claims 1, wherein an electric circuit is integrated on the semiconductor substrate.

22. An optical encoder according to claim 21, wherein the electric circuit is a signal processing circuit and/or a light source driving circuit.

23. An optical encoder according to claims 1, wherein the light source and the semiconductor substrate are fixed on a common substrate, and a portion of the common substrate on which the light source is disposed has a height different from that of a portion on which the semiconductor substrate is fixed.

24. An optical encoder according to claim 23, wherein the portion of the common substrate on which the light source is disposed is a concave portion with respect to the portion on which the semiconductor substrate is fixed.

25. An optical encoder according to claims 1, wherein given that a distance from the slit to the scale is z1, and a distance from the scale to the light receiving surface of the photodetector is z2, z1 and z2 are configured to be substantially equal to one another.

26. An optical lens module for carrying out detection of a position of a movable lens by using an optical encoder according to claim 1.

* * * * *